(12) United States Patent
Srinivasan et al.

(10) Patent No.: US 11,867,111 B2
(45) Date of Patent: Jan. 9, 2024

(54) VALVE ARRANGEMENT FOR SPLIT-FLOW CLOSE-COUPLED CATALYST

(71) Applicant: Cummins Emission Solutions Inc., Columbus, IN (US)

(72) Inventors: Anand Srinivasan, Greenwood, IN (US); John K. Heichelbech, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/609,681

(22) PCT Filed: May 9, 2019

(86) PCT No.: PCT/US2019/031542
§ 371 (c)(1),
(2) Date: Nov. 8, 2021

(87) PCT Pub. No.: WO2020/226656
PCT Pub. Date: Nov. 12, 2020

(65) Prior Publication Data
US 2022/0220880 A1    Jul. 14, 2022

(51) Int. Cl.
*F01N 3/28* (2006.01)
*F01N 13/00* (2010.01)
(Continued)

(52) U.S. Cl.
CPC ......... *F01N 3/2892* (2013.01); *B01D 53/944* (2013.01); *B01D 53/9418* (2013.01);
(Continued)

(58) Field of Classification Search
CPC ...... F01N 3/2892; F01N 13/011; F01N 3/021; F01N 3/106; F01N 3/2006; F01N 3/2066;
(Continued)

(56) References Cited

U.S. PATENT DOCUMENTS

| 2,805,544 | A | 9/1957 | Wells |
| 4,314,345 | A | 2/1982 | Shiraishi et al. |

(Continued)

FOREIGN PATENT DOCUMENTS

| CN | 1804378 A | 7/2006 |
| CN | 1809685 A | 7/2007 |

(Continued)

OTHER PUBLICATIONS

Advisory Action issued for U.S. Appl. No. 14/838,910, dated Aug. 29, 2017, 9 pages.

(Continued)

*Primary Examiner* — Timothy C Vanoy
(74) *Attorney, Agent, or Firm* — Foley & Lardner LLP

(57) ABSTRACT

An aftertreatment system includes a first exhaust gas path, a second exhaust gas path, and a selector valve configured to divert exhaust gas between the first exhaust gas path and the second exhaust gas path based on a temperature of the exhaust gas. The aftertreatment system also includes a controller programmed to control the selector valve such that the selector valve diverts at least a portion of the exhaust gas to the first exhaust gas path when the temperature of the exhaust gas is equal to or less than a predetermined temperature threshold and the selector valve diverts the exhaust gas to the second exhaust gas path when the temperature of the exhaust gas is greater than the predetermined temperature threshold. The first exhaust gas path includes a heater configured to heat the exhaust gas received in the first exhaust gas path.

17 Claims, 6 Drawing Sheets

(51) Int. Cl.
  *F01N 3/20* (2006.01)
  *F01N 3/021* (2006.01)
  *F01N 3/10* (2006.01)
  *F01N 9/00* (2006.01)
  *B01D 53/94* (2006.01)
  *B01J 29/072* (2006.01)
  *B01J 23/745* (2006.01)
  *B01J 19/00* (2006.01)
  *G05D 7/06* (2006.01)

(52) U.S. Cl.
  CPC ..... *B01D 53/9436* (2013.01); *B01D 53/9477* (2013.01); *B01D 53/9495* (2013.01); *B01J 19/0033* (2013.01); *B01J 23/745* (2013.01); *B01J 29/072* (2013.01); *F01N 3/021* (2013.01); *F01N 3/106* (2013.01); *F01N 3/2006* (2013.01); *F01N 3/2066* (2013.01); *F01N 3/2803* (2013.01); *F01N 9/00* (2013.01); *F01N 13/011* (2014.06); *G05D 7/0635* (2013.01); *B01D 2255/20723* (2013.01); *B01D 2255/20738* (2013.01); *B01D 2255/20761* (2013.01); *B01D 2255/904* (2013.01); *B01D 2255/915* (2013.01); *F01N 2370/04* (2013.01); *F01N 2610/1453* (2013.01)

(58) Field of Classification Search
  CPC ...... F01N 3/2803; F01N 9/00; F01N 2370/04; F01N 2610/1453; B01D 53/9418; B01D 53/9436; B01D 53/944; B01D 53/9477; B01D 53/9495; B01D 2255/20723; B01D 2255/20738; B01D 2255/20761; B01D 2255/904; B01D 2255/915; B01J 19/0033; B01J 23/745; B01J 29/072; G05D 7/0635
  See application file for complete search history.

(56) References Cited

U.S. PATENT DOCUMENTS

| | | |
|---|---|---|
| 4,945,722 A | 8/1990 | Goerlich |
| 5,467,594 A | 11/1995 | Aoki et al. |
| 5,552,128 A | 9/1996 | Chang et al. |
| 5,809,775 A | 9/1998 | Tarabulski et al. |
| 5,946,221 A | 8/1999 | Fish et al. |
| 6,109,024 A | 8/2000 | Kinugasa et al. |
| 6,125,629 A | 10/2000 | Patchett |
| 6,182,443 B1 | 2/2001 | Jarvis et al. |
| 6,233,927 B1 | 5/2001 | Hirota et al. |
| 6,266,955 B1 | 7/2001 | Liang et al. |
| 6,269,633 B1 | 8/2001 | van Nieuwstadt et al. |
| 6,295,809 B1 | 10/2001 | Hammerle et al. |
| 6,311,484 B1 | 11/2001 | Roth et al. |
| 6,375,828 B2 | 4/2002 | Ando et al. |
| 6,415,602 B1 | 7/2002 | Patchett et al. |
| 6,427,439 B1 | 8/2002 | Xu et al. |
| 6,446,430 B1 | 9/2002 | Roth et al. |
| 6,546,720 B2 | 4/2003 | van Nieuwstadt |
| 6,581,374 B2 | 6/2003 | Patchett et al. |
| 6,662,553 B2 | 12/2003 | Patchett et al. |
| 6,701,707 B1 | 3/2004 | Upadhyay et al. |
| 6,713,030 B1 | 3/2004 | Chandler et al. |
| 6,742,326 B2 | 6/2004 | Xu et al. |
| 6,742,330 B2 | 6/2004 | Genderen |
| 6,829,885 B2 | 12/2004 | Surnilla et al. |
| 6,834,496 B2 | 12/2004 | Nakatani et al. |
| 6,882,929 B2 | 4/2005 | Liang et al. |
| 6,892,530 B2 | 5/2005 | Montreuil et al. |
| 6,901,745 B2 | 6/2005 | Schnaibel et al. |
| 6,928,806 B2 | 8/2005 | Tennison et al. |
| 6,981,368 B2 | 1/2006 | van Nieuwstadt et al. |
| 6,993,900 B2 | 2/2006 | Upadhyay et al. |
| 7,017,389 B2 | 3/2006 | Gouma |
| 7,063,642 B1 | 6/2006 | Hu et al. |
| 7,093,427 B2 | 8/2006 | van Nieuwstadt et al. |
| 7,113,835 B2 | 9/2006 | Boyden et al. |
| 7,117,046 B2 | 10/2006 | Boyden et al. |
| 7,134,273 B2 | 11/2006 | Mazur et al. |
| 7,150,145 B2 | 12/2006 | Patchett et al. |
| 7,168,243 B2 | 1/2007 | Endicott et al. |
| 7,178,328 B2 | 2/2007 | Solbrig |
| 7,204,081 B2 | 4/2007 | Yasui et al. |
| 7,213,395 B2 | 5/2007 | Hu et al. |
| 7,260,927 B2 | 8/2007 | Hsu |
| 7,263,825 B1 | 9/2007 | Wills et al. |
| 7,293,410 B2 | 11/2007 | Miura |
| 7,320,781 B2 | 1/2008 | Lambert et al. |
| 7,332,135 B2 | 2/2008 | Gandhi et al. |
| 7,334,400 B2 | 2/2008 | Yan et al. |
| 7,377,101 B2 | 5/2008 | Mital et al. |
| 7,485,272 B2 | 2/2009 | Driscoll et al. |
| 7,603,846 B2 | 10/2009 | Lueders et al. |
| 7,628,009 B2 | 12/2009 | Hu et al. |
| 7,631,490 B2 | 12/2009 | Colignon |
| 7,650,746 B2 | 1/2010 | Hu et al. |
| 7,665,297 B2 | 2/2010 | Suzuki et al. |
| 7,685,813 B2 | 3/2010 | McCarthy, Jr. |
| 7,743,608 B2 | 6/2010 | Ogiso |
| 7,802,419 B2 | 9/2010 | Doring |
| 7,832,200 B2 | 11/2010 | Kesse et al. |
| 7,861,518 B2 | 1/2011 | Federie |
| 7,892,508 B2 | 2/2011 | Katoh |
| 7,950,222 B2 | 5/2011 | Hodzen |
| 7,984,608 B2 | 7/2011 | Roozenboom |
| 7,997,070 B2 | 8/2011 | Yasui et al. |
| 8,020,374 B2 | 9/2011 | Walz et al. |
| 8,061,126 B2 | 11/2011 | Gady et al. |
| 8,074,445 B2 | 12/2011 | Ofoli et al. |
| 8,307,630 B2 | 11/2012 | Askew |
| 8,615,990 B2 | 12/2013 | Wilhelm et al. |
| 2002/0044897 A1 | 4/2002 | Kakwani et al. |
| 2003/0061802 A1 | 4/2003 | Nakatani |
| 2003/0066287 A1 | 4/2003 | Hirota et al. |
| 2003/0177766 A1 | 9/2003 | Wang et al. |
| 2003/0182935 A1 | 10/2003 | Kawai et al. |
| 2004/0098968 A1 | 5/2004 | van Nieuwstadt et al. |
| 2004/0112046 A1 | 6/2004 | Tumati et al. |
| 2004/0128982 A1 | 7/2004 | Patchett et al. |
| 2005/0160722 A1 | 7/2005 | Shih et al. |
| 2005/0260761 A1 | 11/2005 | Lanier et al. |
| 2005/0282285 A1 | 12/2005 | Radhamohan et al. |
| 2006/0053776 A1 | 3/2006 | Ancimer |
| 2006/0059896 A1 | 3/2006 | Liu et al. |
| 2006/0086080 A1 | 4/2006 | Katogi et al. |
| 2006/0130458 A1 | 6/2006 | Solbrig |
| 2006/0144038 A1 | 7/2006 | Miura |
| 2006/0155486 A1 | 7/2006 | Walsh et al. |
| 2006/0212140 A1 | 9/2006 | Brackney |
| 2007/0006574 A1 | 1/2007 | Nakano |
| 2007/0044456 A1 | 3/2007 | Upadhyay et al. |
| 2007/0137181 A1 | 6/2007 | Upadhyay et al. |
| 2007/0137182 A1 | 6/2007 | Driscoll |
| 2007/0137184 A1 | 6/2007 | Patchett et al. |
| 2007/0163244 A1 | 7/2007 | Federle |
| 2007/0214777 A1 | 9/2007 | Allansson et al. |
| 2007/0295003 A1 | 12/2007 | Dingle et al. |
| 2008/0009940 A1 | 1/2008 | Cribier |
| 2008/0022658 A1 | 1/2008 | Viola et al. |
| 2008/0022659 A1 | 1/2008 | Viola et al. |
| 2008/0031793 A1 | 2/2008 | Difrancesco et al. |
| 2008/0060348 A1 | 3/2008 | Robel et al. |
| 2008/0066455 A1 | 3/2008 | Viola |
| 2008/0102010 A1 | 5/2008 | Bruck et al. |
| 2008/0141663 A1 | 6/2008 | Ono |
| 2008/0250774 A1 | 10/2008 | Solbrig |
| 2008/0250778 A1 | 10/2008 | Solbrig |
| 2008/0295499 A1 | 12/2008 | Driscoll et al. |
| 2009/0038303 A1 | 2/2009 | Takeuchi et al. |
| 2009/0049827 A1 | 2/2009 | Wei et al. |
| 2009/0214397 A1 | 8/2009 | Shirono et al. |
| 2009/0266063 A1 | 10/2009 | Gandhi et al. |

(56) References Cited

U.S. PATENT DOCUMENTS

| | | | |
|---|---|---|---|
| 2009/0272099 | A1 | 11/2009 | Garimella et al. |
| 2009/0272101 | A1 | 11/2009 | Wills et al. |
| 2009/0272104 | A1 | 11/2009 | Garimella et al. |
| 2009/0272105 | A1 | 11/2009 | Chi et al. |
| 2009/0301066 | A1 | 12/2009 | Sindano et al. |
| 2009/0308052 | A1 | 12/2009 | Zhang et al. |
| 2010/0024390 | A1 | 2/2010 | Wills et al. |
| 2010/0024393 | A1 | 2/2010 | Chi et al. |
| 2010/0024397 | A1 | 2/2010 | Chi et al. |
| 2010/0028230 | A1 | 2/2010 | Gady et al. |
| 2010/0043404 | A1 | 2/2010 | Hebbale et al. |
| 2010/0050614 | A1 | 3/2010 | Parmentier et al. |
| 2010/0122526 | A1 | 5/2010 | Vanderveen et al. |
| 2010/0146945 | A1 | 6/2010 | Niimi et al. |
| 2010/0199643 | A1 | 8/2010 | Yacoub |
| 2010/0229531 | A1 | 9/2010 | Chi et al. |
| 2010/0242438 | A1 | 9/2010 | Mital |
| 2010/0242440 | A1 | 9/2010 | Garimella et al. |
| 2010/0275583 | A1 | 11/2010 | Farrell et al. |
| 2010/0313858 | A1 | 12/2010 | Springer et al. |
| 2010/0326052 | A1 | 12/2010 | Sun |
| 2011/0262329 | A1 | 10/2011 | Ofoli et al. |
| 2014/0223902 | A1 | 8/2014 | Yacoub |
| 2014/0260205 | A1* | 9/2014 | Golin .................... F01N 3/2066 60/278 |
| 2014/0352279 | A1 | 12/2014 | Gonze et al. |
| 2015/0023854 | A1 | 1/2015 | Lim et al. |
| 2015/0337702 | A1* | 11/2015 | Ettireddy ........... B01D 53/9477 60/297 |
| 2015/0369108 | A1 | 12/2015 | Norris et al. |
| 2017/0138242 | A1 | 5/2017 | Andersson et al. |
| 2017/0254250 | A1 | 9/2017 | Steinhauser et al. |

FOREIGN PATENT DOCUMENTS

| | | |
|---|---|---|
| CN | 106460611 A | 2/2017 |
| DE | 10 2007 044 192 A1 | 6/2008 |
| DE | 60 2005 004 814 T2 | 2/2009 |
| EP | 1 129 278 B1 | 8/2003 |
| EP | 1 338 562 B1 | 8/2003 |
| EP | 1 339 955 B1 | 9/2003 |
| EP | 1 083 979 B1 | 6/2004 |
| EP | 1 431 533 A2 | 6/2004 |
| EP | 1 609 977 A2 | 12/2005 |
| EP | 1 672 192 A1 | 6/2006 |
| EP | 1 712 764 A1 | 10/2006 |
| JP | 06-330735 | 11/1994 |
| JP | 10-118492 A | 5/1998 |
| JP | 10-288030 A | 10/1998 |
| JP | 2002-327617 A | 11/2002 |
| JP | 2003-193828 | 7/2003 |
| JP | 2004-100700 A | 4/2004 |
| JP | 2007-255367 A | 10/2007 |
| JP | 2009-180102 A | 8/2009 |
| JP | 2013-142367 A | 7/2013 |
| JP | 2016-217297 A | 12/2016 |
| KR | 1020030034139 A | 1/2003 |
| KR | 1020010043138 A | 5/2005 |
| KR | 1020080030163 A | 4/2008 |
| KR | 1020100061145 A | 11/2008 |
| WO | WO-99/55446 A1 | 11/1999 |
| WO | WO-02/14657 A1 | 2/2002 |
| WO | WO-2004/000443 A1 | 12/2003 |
| WO | WO-2006/000877 A3 | 1/2006 |
| WO | WO-2006/095918 A1 | 9/2006 |
| WO | WO-2007/014649 A1 | 2/2007 |
| WO | WO-2007/066502 A1 | 6/2007 |
| WO | WO-2008/009940 A2 | 1/2008 |

OTHER PUBLICATIONS

Final Office Action for U.S. Appl. No. 12/112,678 dated Jul. 22, 2011, 17 pages.
Final Office Action for U.S. Appl. No. 12/433,730 dated Oct. 9, 2012, 16 pages.
Final Office Action for U.S. Appl. No. 12/767,664 dated Mar. 28, 2013, 16 pages.
First Office Action for Chinese Patent App. No. 200980115540.1 dated Jun. 26, 2012, 11 pages (with translation).
First Office Action issued for Indian Patent Application No. IN202147047795 dated Jan. 3, 2022, 7 pages.
International Search Report & Written Opinion for PCT/US2009/042321 dated Dec. 14, 2009, 7 pages.
International Search Report & Written Opinion for PCT/US2009/042330 dated Dec. 17, 2009, 7 pages.
International Search Report & Written Opinion for PCT/US2009/042335 dated Dec. 14, 2009, 7 pages.
International Search Report & Written Opinion for PCT/US2009/042340 dated Dec. 16, 2009, 8 pages.
International Search Report & Written Opinion for PCT/US2009/042406 dated Dec. 18, 2009, 6 pages.
International Search Report & Written Opinion for PCT/US2009/042409 dated Nov. 25, 2009, 6 pages.
International Search Report & Written Opinion for PCT/US2009/042412 dated Dec. 16, 2009, 6 pages.
International Search Report & Written Opinion for PCT/US2009/042419 dated Jan. 27, 2010, 6 pages.
International Search Report & Written Opinion for PCT/US2009/042423 dated Nov. 27, 2009, 6 pages.
International Search Report & Written Opinion for PCT/US2009/067020 dated Jul. 13, 2010, 8 pages.
International Search Report & Written Opinion PCT/US2009/067023 dated Jul. 13, 2010, 7 pages.
International Search Report & Written Opinion for PCT/US2010/048502 dated May 23, 2011, 7 pages.
International Search Report & Written Opinion for PCT/US2011/033767 dated Feb. 8, 2012, 7 pages.
International Search Report & Written Opinion for PCT/US2019/031542, dated Jul. 25, 2019, 10 pages.
Kim et al., "Electrically Heated Catalysts for Cold-Start Emissions in Diesel Aftertreatment," SAE Technical Paper 2012-01-1092, 2012, https://doi.org/10.4271/2012-01-1092.
Notice of Allowance for U.S. Appl. No. 12/112,500 dated Sep. 29, 2011, 5 pages.
Notice of Allowance for U.S. Appl. No. 12/112,622 dated Aug. 5, 2011, 8 pages.
Notice of Allowance for U.S. Appl. No. 12/112,678 dated Feb. 2, 2012, 8 pages.
Notice of Allowance for U.S. Appl. No. 12/112,795 dated Mar. 2, 2012, 10 pages.
Notice of Allowance for U.S. Appl. No. 12/433,586 dated Jul. 12, 2012, 5 pages.
Notice of Allowance for U.S. Appl. No. 12/433,600 dated Nov. 14, 2011, 8 pages.
Notice of Allowance for U.S. Appl. No. 12/433,705 dated Nov. 8, 2011, 5 pages.
Notice of Allowance for U.S. Appl. No. 12/433,730 dated Apr. 11, 2013, 8 pages.
Notice of Allowance for U.S. Appl. No. 12/433,767 dated Aug. 3, 2012, 5 pages.
Notice of Allowance for U.S. Appl. No. 12/632,628 dated Oct. 1, 2012, 5 pages.
Notice of Allowance for U.S. Appl. No. 12/632,646 dated Jun. 4, 2012, 8 pages.
Notice of Allowance for U.S. Appl. No. 12/767,664 dated Jan. 21, 2014, 9 pages.
Office Action for German Patent App. No. 112010003613.6 dated Jun. 11, 2018, 7 pages (German only).
Office Action for U.S. Appl. No. 12/112,500 dated Apr. 15, 2011, 7 pages.
Office Action for U.S. Appl. No. 12/112,622 dated Mar. 3, 2011, 6 pages.
Office Action for U.S. Appl. No. 12/112,678 dated Feb. 7, 2011, 14 pages.
Office Action for U.S. Appl. No. 12/112,678 dated Sep. 30, 2011, 13 pages.

(56) References Cited

OTHER PUBLICATIONS

Office Action for U.S. Appl. No. 12/112,795 dated Sep. 20, 2011, 24 pages.
Office Action for U.S. Appl. No. 12/433,586 dated Mar. 20, 2012, 7 pages.
Office Action for U.S. Appl. No. 12/433,705 dated Nov. 8, 2011, 8 pages.
Office Action for U.S. Appl. No. 12/433,730 dated May 10, 2012, 19 pages.
Office Action for U.S. Appl. No. 12/433,730 dated Oct. 7, 2011, 16 pages.
Office Action for U.S. Appl. No. 12/433,767 dated Apr. 6, 2012, 9 pages.
Office Action for U.S. Appl. No. 12/433,767 dated Oct. 26, 2011, 8 pages.
Office Action for U.S. Appl. No. 12/632,628 dated Apr. 30, 2012, 9 pages.
Office Action for U.S. Appl. No. 12/767,664 dated Aug. 3, 2012, 23 pages.
Office Action for U.S. Appl. No. 12/767,664 dated Sep. 12, 2013, 14 pages.
Office Action for U.S. Appl. No. 12/879,776 dated Dec. 12, 2012, 10 pages.
Office Action issued for German Patent Application No. DE 112010003378.1 dated Dec. 5, 2019, 11 pages.
Pena, et al., "Identification of Surface Species on Titania-Supported Manganese, Chromium, and Copper Oxide Low-Temperature SCR Catalysts," The Journal of Physical Chemistry B 108(28), pp. 9927-9936 (2004).
Schar, et al., "Control of a Urea SCR Catalytic Converter System for a Mobile Heavy Duty Diesel Engine," SAE Transactions 112(3), pp. 1180-1188 (2003).
International Search Report and Written Opinion of the International Searching Authority issued in PCT/US2011/055931, dated Mar. 5, 2012.
U.S. Notice of Allowance issued for U.S. Appl. No. 13/271,626 dated Jun. 22, 2015.
U.S. Office Action on U.S. Appl. No. 13/271,626, dated Aug. 6, 2014, 34 pages.
International Search Report and Written Opinion issued for PCT/US2010/046430, dated May 30, 2011, 9 pages.
Office action in Chinese Patent Application No. 201980096116.0, dated Mar. 22, 2023.
Combined Search and Examination Report issued is UK Patent Application No. 2312011.6 dated Oct. 2, 2023.
Examination Report in UK Patent Application No. 2312011.6 dated Oct. 30, 2023.

\* cited by examiner

VALVE ARRANGEMENT FOR SPLIT-FLOW CLOSE-COUPLED CATALYST

CROSS-REFERENCE TO RELATED APPLICATION

The present application is a National Stage of PCT Application No. PCT/US2019/031542, filed May 9, 2019. The contents of this application are hereby incorporated by reference in their entirety.

TECHNICAL FIELD

The present disclosure relates generally to aftertreatment systems for use with internal combustion engines.

BACKGROUND

An exhaust aftertreatment system is used to treat exhaust gas generated by an internal combustion engine. The exhaust aftertreatment system typically includes a selective catalytic reduction system that is formulated to reduce oxides of nitrogen in the exhaust gas in the presence of a catalyst and reductant. The exhaust aftertreatment system may also include one or more filters to remove debris and other particulates from the exhaust gas. By treating the exhaust gas using the exhaust aftertreatment system, the exhaust aftertreatment system reduces the levels of harmful emissions in the exhaust gas that would otherwise be emitted into the atmosphere. However, present day exhaust aftertreatment systems have limitations due to their configuration and the way they operate.

SUMMARY

In accordance with some aspects of the present disclosure, an aftertreatment system is disclosed. The aftertreatment system includes a first exhaust gas path, a second exhaust gas path, and a selector valve configured to divert exhaust gas between the first exhaust gas path and the second exhaust gas path based on a temperature of the exhaust gas. The aftertreatment system also includes a controller programmed to control the selector valve such that the selector valve diverts at least a portion of the exhaust gas to the first exhaust gas path when the temperature of the exhaust gas is equal to or less than a predetermined temperature threshold and the selector valve diverts the exhaust gas to the second exhaust gas path when the temperature of the exhaust gas is greater than the predetermined temperature threshold. The first exhaust gas path includes a heater configured to heat the exhaust gas received in the first exhaust gas path.

In accordance with some other aspects of the present disclosure, a method is disclosed. The method includes determining, by a controller associated with an aftertreatment system, a temperature of exhaust gas, comparing, by the controller, the temperature of the exhaust gas with a predetermined temperature threshold, and when the temperature of the exhaust gas is equal to or less than the predetermined temperature threshold, adjusting a selector valve to a first position so as to divert at least a portion of the exhaust gas to a first exhaust gas path, and heating the exhaust gas in the first exhaust gas path, and when the temperature of the exhaust gas is greater than the predetermined temperature threshold, adjusting the selector valve to a second position so as to divert at least a portion of the exhaust gas to a second exhaust gas path.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
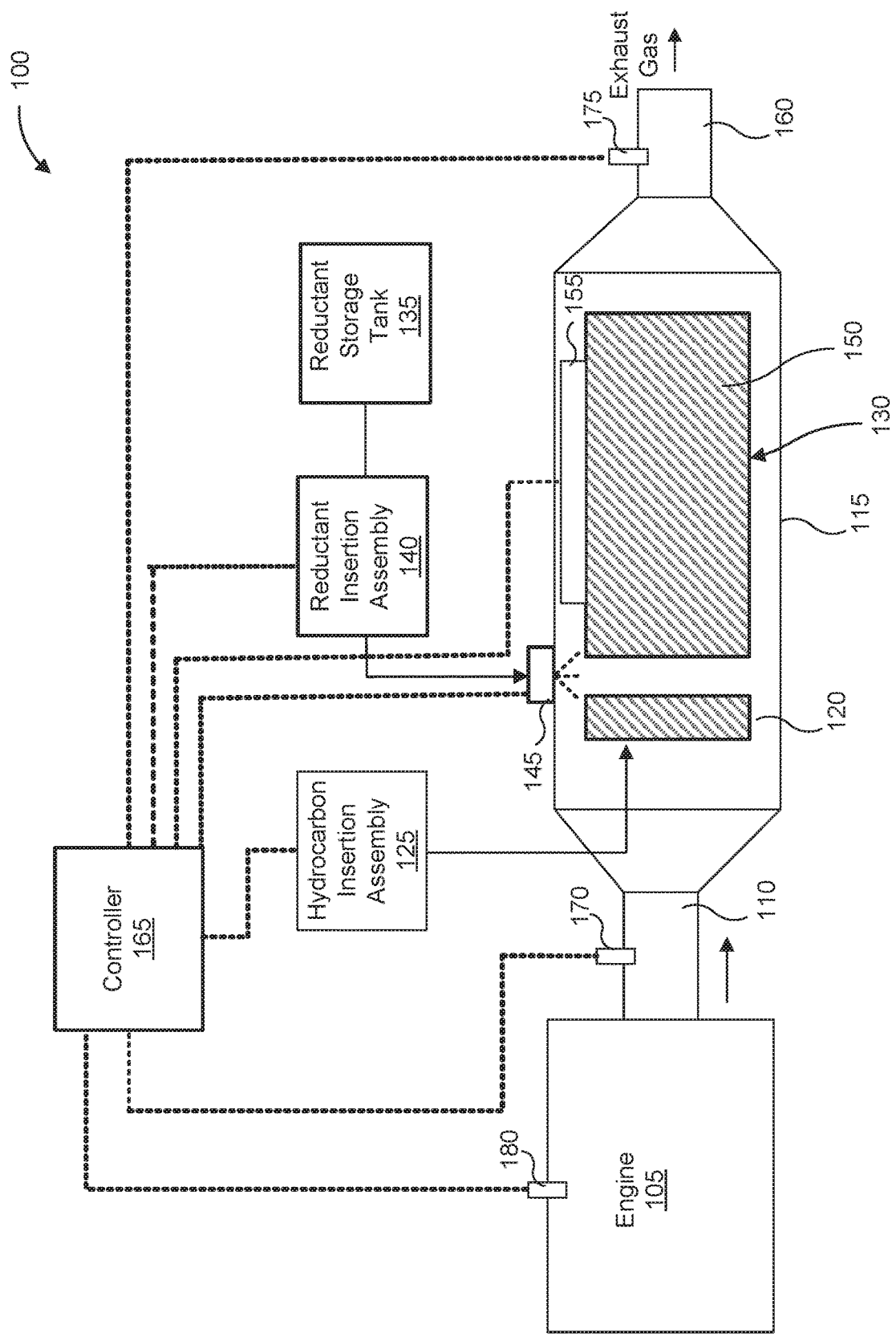
FIG. 1 is an example block diagram of an aftertreatment system, in accordance with some embodiments of the present disclosure.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented herein. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

This application is directed to an aftertreatment system designed to treat exhaust gases emitted from an engine. The aftertreatment system may remove various types of undesirable constituents from the exhaust gas before releasing the treated exhaust gas into the atmosphere. The aftertreatment system may include a decomposition chamber, which receives a reductant that is converted into gaseous ammonia and mixed with the exhaust gas. The mixture of the exhaust gas and gaseous ammonia is diverted to a selective catalytic reduction ("SCR") system where the gaseous ammonia is catalyzed to reduce NOx in the exhaust gas.

The decomposition chamber and the SCR system are configured to operate optimally at certain temperatures (e.g., temperatures greater than 180° C.). At lower temperatures, such as those encountered during cold-start conditions, the reductant that is injected into the decomposition chamber is more susceptible to forming solid deposits on the walls of the decomposition chamber. The reductant that is deposited on the walls of the decomposition chamber is not converted into gaseous ammonia and does not mix with the exhaust gas. Without sufficient gaseous ammonia in the mixture, the reaction in the SCR system is impacted and desirable levels of NOx reduction are not achieved. Thus, increased amounts of reductant may be needed to achieve desirable levels of NOx reduction during low temperatures. Further, at lower temperatures, even if the decomposition chamber is operating efficiently, the SCR system may be unable to reach its desired levels of NOx reduction, thereby emitting greater amounts of NOx in the atmosphere and potentially violating certain emission regulations.

Further, the SCR system uses an SCR catalyst that needs to adsorb a sufficient amount of gaseous ammonia before reducing NOx in the exhaust gas. At certain temperatures (e.g., close to 300° C.), the adsorbed ammonia may be desorbed and lost to the environment. Thus, it is undesirable to keep the SCR system filled with ammonia at all times. However, during low temperatures when the SCR system is already operating at a lower efficiency, waiting for sufficient ammonia to adsorb in the SCR catalyst further decreases performance. Thus, low temperatures create challenges such as formation of solid deposits on the walls of the decomposition chamber and the SCR system not readily converting NOx.

To increase the efficiency of the decomposition chamber and the SCR system during low temperatures, the reductant may be inserted into the decomposition chamber in a vaporized form to reduce formation of solid deposits on the walls of the decomposition chamber. While the vaporizer is beneficial during the low temperatures, a vaporizer is not necessarily needed during normal temperature operation of the engine. In some cases, a special SCR catalyst that is optimized for low temperature operating conditions may be used in the SCR system. However, the optimized SCR catalyst by itself may not be enough to achieve the desired levels of NOx reduction. Keeping the SCR system filled with ammonia at all times is also not feasible since the ammonia tends to desorb at normal temperature operating conditions.

Thus, the present disclosure provides technical solutions for increasing the operating efficiency of the decomposition chamber and/or the SCR system. The aftertreatment system of the present disclosure provides a dual-leg system in which the exhaust gas exiting the engine may take a first exhaust gas path if the temperature of the exhaust gas is equal to or less than a predetermined temperature threshold and take a second exhaust gas path if the temperature of the exhaust gas path is greater than the predetermined temperature threshold. Thus, in some embodiments, the exhaust gas may be directed to the first exhaust gas path during low temperatures and to the second exhaust gas path during normal temperatures. A selector valve may be used to divert the exhaust gas between the first exhaust gas path or the second exhaust gas path. The first exhaust gas path may be optimized for low temperature operation.

For example, in some embodiments, a heater may be used to heat at least a portion of the gas diverted to the first exhaust gas path. The heater may be activated for a period of time until the temperature of the exhaust gas attains a desired target temperature. In some embodiments, a controller may selectively and dynamically activate and deactivate the heater based on the current and desired temperatures in the decomposition chamber and/or within the SCR system using feedback inputs. In some embodiments, all of the exhaust gas may be heated during low temperature conditions, while in other embodiments, only a portion of the exhaust gas may be heated during the low temperature conditions. Heating even a portion of the exhaust gas may improve efficiency of the decomposition chamber and/or the SCR system during low temperatures.

Further, in some embodiments, a vaporizer may be used in the first exhaust gas path to further improve the efficiency of the decomposition chamber. In some embodiments, the SCR system may use an SCR catalyst optimized for low temperature operation. Because during low temperatures, the ammonia does not readily desorb, in some embodiments, the SCR system may be filled with ammonia at all times.

Thus, the present disclosure provides an effective mechanism for improving the efficiency of the aftertreatment system during low temperature operating conditions of the engine.

Referring now to FIG. 1, an example block diagram of an aftertreatment system 100 is shown, in accordance with some embodiments of the present disclosure. The aftertreatment system 100 is configured to receive exhaust gas from an engine 105. The engine 105 may be a compression ignited internal combustion engine such as a diesel engine, a spark-ignited internal combustion engine such as a gasoline engine, or any other types of engine such as a natural gas engine, a dual fuel engine, a biodiesel engine, an E-85 engine, etc. The engine 105 emits exhaust gas as a result of combustion of air from the atmosphere with fuel. The exhaust gas is discharged from the engine 105, via an inlet conduit 110, into a housing 115.

The housing 115 defines an internal volume within which one or more elements for treating the exhaust gas are disposed. To withstand the operating conditions, the housing 115 may be formed from a rigid, heat-resistant, and corrosion-resistant material such as stainless steel, iron, aluminum, metals, ceramics, or any other suitable material. Although the housing 115 has been shown in FIG. 1 as having a particular shape and size, the housing may have any suitable cross-section (e.g., circular, square, rectangular, oval, elliptical, polygonal, etc.) and any suitable size. The housing 115 may house an oxidation catalyst 120 for oxidizing nitric oxide and certain types of particulate matter from the exhaust gas, and decomposing unburnt hydrocarbons from the exhaust gas. In some embodiments, the oxidation catalyst 120 may be a diesel oxidation catalyst ("DOC") or other type of oxidation catalyst that is suitable for use in the aftertreatment system 100.

In some embodiments, the aftertreatment system 100 may include a hydrocarbon insertion assembly 125 for selectively injecting a hydrocarbon (e.g., fuel) into the oxidation catalyst 120. The oxidation catalyst 120 may catalyze ignition of the hydrocarbon so as to increase a temperature of the exhaust gas for regenerating the oxidation catalyst. In some embodiments, the aftertreatment system 100 may also include a particulate filter (not shown in FIG. 1) within the housing 115. The particulate filter may be disposed downstream or upstream of the oxidation catalyst 120. When positioned "upstream" of the oxidation catalyst 120, the particulate filter may be positioned between the inlet conduit 110 and the oxidation catalyst such that the exhaust gas exiting the particulate filter enters the oxidation catalyst. When positioned "downstream" of the oxidation catalyst 120, the particulate filter may be positioned between the oxidation catalyst and a selective catalytic reduction ("SCR") system 130 such that the exhaust gas exiting the oxidation catalyst enters the particulate filter. In some embodiments, particulate filters may be provided both upstream and downstream of the oxidation catalyst 120.

The particulate filter may be configured to remove particulate matter (e.g., soot, debris, inorganic particles, etc.) from the exhaust gas. The particulate filter may be any of a variety of filters that are suitable for use within the aftertreatment system 100. For example, in some embodiments, the particulate filter may be a diesel particulate filter ("DPF") having a ceramic filter (e.g. cordierite), and may be symmetric or asymmetric. In some embodiments, the particulate filter may be catalyzed. In some embodiments, the oxidation catalyst 120 and the particulate filter may be integrated into a single component.

The housing 115 may also include the SCR system 130 that is configured to reduce constituents such as oxides of nitrogen (NOx) gases, carbon monoxide (CO) gases, hydrocarbons, etc. from the exhaust gas. The SCR system 130 may include or be associated with a decomposition chamber that is configured to receive reductant from a reductant storage tank 135 via a reductant insertion assembly 140. A reductant port 145 may be positioned on a sidewall of the housing 115 to allow insertion of the reductant into an internal volume of the decomposition chamber. In some embodiments, the reductant port 145 may include a reductant injector that is configured to combine a flow of reductant received via the reductant port 145 with compressed air, and deliver a stream or a jet of the reductant-air combination into the decomposition chamber. In some embodiments, the reductant injector may be a nozzle of a predetermined diameter. In other embodiments, other mechanisms may be used to selectively deliver the reductant into the decomposition chamber. Thus, the decomposition chamber may be configured to receive exhaust gas and a reductant, and facilitate mixing of the exhaust gas with the reductant to form an exhaust gas-reductant mixture. In some embodiments, mixers, baffles, vanes, or other structures may be used in conjunction with the decomposition chamber to further facilitate mixing of the reductant with the exhaust gas.

The decomposition chamber may be positioned in a variety of locations. For example, in some embodiments, the decomposition chamber may be positioned upstream of the SCR system 130 to allow the reductant to be inserted, via the reductant port 145, into the decomposition chamber upstream of the SCR system. In other embodiments, the decomposition chamber may be structured such that the reductant port 145 is configured to allow the reductant to be inserted directly on the SCR system 130. In yet other embodiments, the decomposition chamber may be disposed in the inlet conduit 110. Thus, the positioning of the decomposition chamber may vary from one embodiment to another.

The reductant that is injected into the decomposition chamber via the reductant port 145 may be stored within the reductant storage tank 135. The reductant facilitates decomposition of the constituents of the exhaust gas (e.g., NOx gases included in the exhaust gas). Any suitable reductant may be used depending upon the constituents of the exhaust gas. For example, in some embodiments, the exhaust gas may include a diesel exhaust gas and the reductant may include a diesel exhaust fluid (e.g., the diesel exhaust fluid marketed under the name ADBLUE®) such as urea, an aqueous solution of urea, or any other fluid that includes ammonia. When aqueous urea solution is used for the reductant, the solution may include a particular ratio of urea to water. For example, in some embodiments, the ratio may be 32.5% by volume of urea and 67.5% by volume of deionized water, 40% by volume of urea and 60% by volume of deionized water, or any other suitable ratio of urea to deionized water. The reductant from the reductant storage tank 135 may be selectively inserted into the decomposition chamber by the reductant insertion assembly 140. The reductant insertion assembly 140 may include various structures to facilitate receipt of the reductant from the reductant storage tank 135 and delivery to the reductant port 145. For example, the reductant insertion assembly 140 may include, or be associated with to control, various pumps, valves, screens, filters, etc. that facilitate receiving the reductant from the reductant storage tank 135 and supplying that reductant to the reductant port 145.

Further, in some embodiments, the reductant may be inserted into the decomposition chamber in liquid form or in gaseous form. In some embodiments, the reductant port 145, and particularly the reductant injector associated with the reductant port, may be configured to inject the reductant in liquid form. In such embodiments, the reductant port 145 may constitute or be part of a "wet doser" or "liquid doser." In other embodiments, a vaporizer may be associated with the reductant port 145, the reductant injector, and/or the reductant insertion assembly 140 to vaporize or convert the liquid reductant into gaseous form before insertion into the housing 115. Whether inserted in liquid form or gaseous form, upon being injected into the decomposition chamber, the reductant undergoes evaporation, thermolysis, and/or hydrolysis to form gaseous ammonia, which is then mixed with the exhaust gas to form the exhaust gas-reductant mixture. The exhaust gas-reductant mixture may then flow over an SCR catalyst 150 of the SCR system 130.

The SCR catalyst 150 is formulated to decompose certain constituents in the exhaust gas using the gaseous ammonia as a reagent in the presence of the SCR catalyst. Specifically, the SCR catalyst 150 causes the gaseous ammonia in the exhaust gas to catalyze, thereby reducing the NOx in the exhaust gas during the oxidation reaction. In some embodiments, the SCR catalyst 150 may include a metal-zeolite catalyst including, but not limited to Cu-CHA-Zeolite (e.g., a Cu-SSZ-13 catalyst), but also other zeolite structures including Cu-SAPO-34 catalyst, Cu-LTA, Cu-AEI, Cu-ZSM, Cu-beta, Cu-Chabazite, or any other suitable catalyst. In other embodiments, the SCR catalyst 150 may include a vanadium, an iron-zeolite, or a copper/iron-zeolite catalyst. In still other embodiments, the SCR catalyst 150 may include a multi-zone catalyst, for example, having a first zone including a copper-zeolite catalyst, and a second zone including an iron-zeolite catalyst, or vice versa. The SCR catalyst 150 may be disposed on a suitable substrate such as, for example, a ceramic (e.g., cordierite) or metallic (e.g., kanthal) monolith core which may, for example, define a honeycomb structure. A washcoat may also be used as a carrier material for the SCR catalyst 150. Such washcoat materials may include, for example, aluminum oxide, titanium dioxide, silicon dioxide, any other suitable washcoat material, or a combination thereof. The monolith core may be securely positioned in a can to form the SCR system 130, which may be installed in the aftertreatment system 100. In some embodiments, a heater 155 may be coupled to the SCR system 130 and configured to heat the exhaust gas within the SCR system and/or the decomposition chamber. In some embodiments, the SCR system 130 may include a selective catalytic reduction filter (SCRF). The treated exhaust gas (e.g., treated to reduce constituents such as NOx gases, unburnt hydrocarbons, etc.) is expelled, via an outlet conduit 160, into the environment.

Although the oxidation catalyst 120, the particulate filter, the decomposition chamber, and the SCR system 130 have been described as being disposed within a single housing (e.g., the housing 115), in some embodiments, one or more of those components may be disposed in separate housings and connected together in operable association. Further, although a single instance of each of the oxidation catalyst 120, the particulate filter, the decomposition chamber, and the SCR system 130 has been described, in some embodiments, multiple instances of one or more of those elements may be provided within the aftertreatment system 100, if suitable.

Referring still to FIG. 1, the aftertreatment system 100 also includes a controller 165 that is configured to control operation of the various elements of the aftertreatment system in treating the exhaust gas. For example, the controller 165 may be operably connected to the reductant insertion assembly 140 to instruct the reductant insertion assembly to selectively deliver the reductant from the reductant storage tank 135 to the reductant port 145. The controller 165 may also be operably connected to the reductant port 145 to selectively operate the reductant port to insert the reductant received from the reductant storage tank 135 into the decomposition chamber. In some embodiments, the reductant insertion assembly 140 may be configured to control operation of the reductant port 145.

The controller 165 may also be configured to control the hydrocarbon insertion assembly 125 to selectively insert hydrocarbons into the oxidation catalyst 120 and control the heater 155 to operate the heater when needed. The controller 165 may also be connected to other elements of the aftertreatment system 100 that are controlled by the controller. The controller 165 may be operably coupled to the various components of the aftertreatment system 100 using any type and any number of wired or wireless connections. For example, in some embodiments, a wired connection such as a serial cable, a fiber optic cable, a CAT5 cable, etc. may be used to communicably connect the controller 165 to one or more elements of the aftertreatment system 100. In other embodiments, a wireless connection such as the Internet, Wi-Fi, cellular, radio, Bluetooth, ZigBee, etc. may be used. In some embodiments, a combination of wired and wireless connections may be used. Further, in some embodiments, a controller area network (CAN) bus may provide the exchange of signals, information, and/or data between the controller 165 and the various elements of the aftertreatment system 100.

The controller 165 may include or be associated with one or more processing units. The processing unit(s) may include a microprocessor, programmable logic controller (PLC) chip, an application specific integrated circuit (ASIC), one or more field programmable gate arrays (FPGAs), a digital signal processor (DSP), a group of processing components, or other suitable electronic processing components. The processing unit(s) of the controller 165 may be configured to execute instructions for performing the operations described herein. The processing unit(s) may be implemented in hardware, firmware, software, or any combination thereof. "Executing an instruction" means that the processing unit(s) may perform operation(s) called for by that instruction. The processing unit(s) may retrieve the instruction from a memory associated with the controller 165 for execution and copy the instruction in an executable form to a physical memory. In some embodiments, the processing unit(s) may be configured to execute the instruction without first copying the instruction to the physical memory. The instruction may be written using one or more programming languages, scripting languages, assembly languages, etc. Thus, the controller 165, via its associated processing unit(s), may be configured to execute instructions, algorithms, commands, or programs stored in the memory associated with the controller.

Although a single controller (e.g., the controller 165) configured to control multiple elements (e.g., the reductant insertion assembly 140, the hydrocarbon insertion assembly 125, the heater 155, etc.) of the aftertreatment system 100 is shown, in some embodiments, separate controllers for one or more of those elements may be used. The controller 165 may include or be associated with other hardware, software, and/or firmware components that may be needed or considered useful to have in performing the functions described herein. The controller 165 may be configured to control the reductant insertion assembly 140, the hydrocarbon insertion assembly 125, the heater 155, and any other element of the aftertreatment system 100 that is controlled by the controller based on data received from one or more sensors, such as sensors 170, 175, and 180.

In some embodiments, the sensor 170 may be positioned to measure one or more parameters in the exhaust gas flowing through the inlet conduit 110. The sensor 170 may include a NOx sensor configured to measure an amount of NOx gases in the exhaust gas flowing into the housing 115. In some embodiments, the sensor 170 may include a temperature sensor to measure the temperature of the exhaust gas at the inlet of the housing 115. In some embodiments, the sensor 170 may include a pressure sensor, an oxygen sensor, a particulate matter sensor, or any other sensor to measure a parameter that may be needed or considered desirable for the controller 165 to have in controlling the various elements of the aftertreatment system 100. Further, although a single sensor (e.g., the sensor 170) is shown in the inlet conduit 110, in some embodiments, multiple sensors positioned at various locations of the inlet conduit may be used. Further, in some embodiments, a single instance of the sensor 170 may be configured to measure a single parameter (e.g., temperature, NOx amount, etc.), while in other embodiments, the single instance of the sensor may be configured to measure multiple parameters.

Similarly, the sensor 175 may be positioned to measure one or more parameters in the exhaust gas flowing through the outlet conduit 160, and the sensor 180 may be positioned to measure one or more parameters associated with the engine 105. Similar to the sensor 170, the sensor 175 may include a single sensor or multiple sensors, and may be configured to measure needed or desirable parameter(s) such as amount of NOx gases expelled into the environment, temperature, pressure, particulate matter, ammonia (e.g., to determine ammonia slip), etc. Likewise, the sensor 180 may include a single sensor or multiple sensors, and may be configured to measure one or more operating parameters from the engine 105.

Although the sensors 170, 175, and 180 have been shown in the aftertreatment system 100 as being positioned in specific locations, the positioning of those sensors may vary as suitable. Further, additional or fewer sensors across various suitable locations of the aftertreatment system 100 may be used. The sensors 170, 175, 180 may be physical sensors or virtual sensors. The sensors 170, 175, 180 may be configured to collect data and transmit that data to the controller 165. Based on the data, the controller 165 may then control operation of other elements (e.g., the hydrocarbon insertion assembly 125, the reductant insertion assembly 140, the heater 155, etc.) of the aftertreatment system 100.

Although certain components of the aftertreatment system 100 are shown and described in FIG. 1, the aftertreatment system may include other or additional elements that may be suitable. For example, in some embodiments, the aftertreatment system 100 may include an ammonia slip catalyst ("ASC") or ammonia oxidation catalyst ("AMOx") to reduce ammonia slip by which ammonia that is not catalyzed by the SCR catalyst 150 may be decomposed. In some embodiments, the aftertreatment system 100 may include mixers, baffle plates, secondary filters (e.g., a secondary partial flow or catalyzed filter), or any other component that may be needed or considered desirable in properly operating the aftertreatment system 100.

Figure 2:
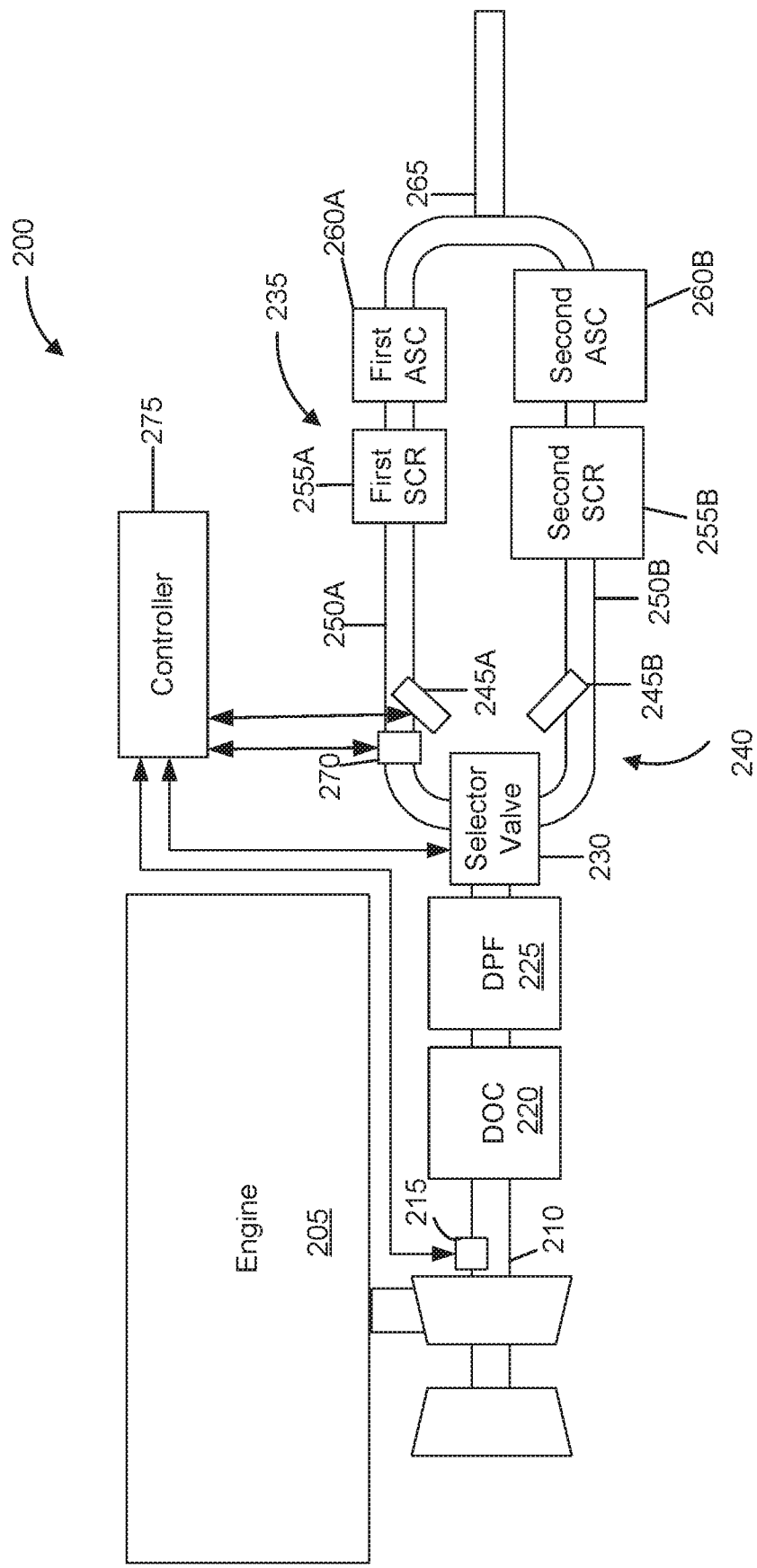
FIG. 2 is another example block diagram of the aftertreatment system showing a close coupled system in which exhaust gas is diverted to either a first exhaust gas path or a second exhaust gas path, in accordance with some embodiments of the present disclosure.

Turning now to FIG. 2, an example block diagram of an aftertreatment system 200 is shown, in accordance with some embodiments of the present disclosure. The aftertreatment system 200 may include similar elements as the aftertreatment system 100, although only some of those elements are shown in FIG. 2. The aftertreatment system 200 includes an engine 205 that emits exhaust gas into an inlet conduit 210. A temperature sensor 215 is configured to measure the temperature of the exhaust gas flowing through the inlet conduit 210. In some embodiments, the temperature sensor 215 may be a thermistor. In other embodiments, the temperature sensor 215 may be another type of temperature measuring device that is suitable for measuring the temperature of the exhaust gas flowing through the inlet conduit 210. The exhaust gas from the inlet conduit 210 is directed through a DOC 220 for oxidizing hydrocarbons from the exhaust gas, and optionally, through a diesel particulate filter ("DPF") 225 positioned downstream of the DOC for removing certain particulate matter from the exhaust gas. The DOC 220 is similar to the oxidation catalyst 120 and the DPF 225 is similar to the particulate filter discussed above.

From the DPF 225, the exhaust gas is directed to a selector valve 230 positioned downstream of the DPF. The selector valve 230 is configured to divert the exhaust gas to a first exhaust gas path 235 or to a second exhaust gas path 240 based on the temperature of the exhaust gas as measured by the temperature sensor 215. The first exhaust gas path 235 includes a first injector 245A that injects a first reductant into a first decomposition chamber 250A of the first exhaust path. The reductant in the first decomposition chamber 250A is converted into gaseous ammonia, and mixed with exhaust gas that is diverted to the first exhaust gas path 235. The mixture of the exhaust gas and gaseous ammonia is diverted to a first SCR 255A positioned downstream of the first decomposition chamber 250A in the first exhaust gas path 235. In the first SCR 255A, the gaseous ammonia is oxidized in the presence of an SCR catalyst to reduce NOx gases in the exhaust gas. The treated exhaust gas is diverted to a first ASC 260A that is positioned downstream of the first SCR 255A. The first ASC 260A decomposes any unreacted ammonia in the exhaust gas received from the first SCR 255A. The exhaust gas from the first ASC 260A is then expelled into the atmosphere via an outlet conduit 265. The first exhaust gas path 235 also includes a heater 270 that is configured to heat the exhaust gas that has been diverted to the first exhaust gas path. In some embodiments, the heater 270 may be an electric heater.

Similarly, the second exhaust gas path 240 includes a second injector 245B for injecting a second reductant into a second decomposition chamber 250B to generate gaseous ammonia therein. The exhaust gas that is diverted to the second exhaust gas path 240 flows into the second decomposition chamber 250B and mixes with the gaseous ammonia. The mixture then enters a second SCR 255B positioned downstream of the second decomposition chamber 250B. In the second SCR 255B, the gaseous ammonia is oxidized in the presence of an SCR catalyst to reduce NOx in the exhaust gas. A second ASC 260B, positioned downstream of the second SCR 255B, decomposes any unreacted ammonia in the exhaust gas. The treated exhaust gas is expelled from the second exhaust gas path 240 into the environment via the outlet conduit 265.

Thus, the exhaust gas exiting the DPF 225 may take one of two close-coupled parallel paths—the first exhaust gas path 235 or the second exhaust gas path 240—based on a position of the selector valve 230. The position of the selector valve 230 may be controlled by a controller 275 based on the temperature of the exhaust gas as measured by the temperature sensor 215. The controller 275 is similar to the controller 165. In some embodiments, the controller 275 may control the position of the selector valve 230 based on temperature of the exhaust gas measured at other locations such as outlet of the DOC 220 or the outlet of the DPF 225.

In some embodiments, the selector valve 230 may be a multi position valve. In some embodiments, the selector valve 230 may, by default, be in a closed position that does not allow the exhaust gas to be diverted to either the first exhaust gas path 235 or the second exhaust gas path 240. Upon receiving instructions from the controller 275 to divert the exhaust gas to the first exhaust gas path 235, the selector valve 230 may move to a first open position that is configured to divert all of the exhaust gas to the first exhaust gas path. Similarly, upon receiving instructions from the controller 275 to divert the exhaust gas to the second exhaust gas path 240, the selector valve 230 may move to a second open position that is configured to divert all of the exhaust gas to the second exhaust gas path. In some embodiments and as discussed further below, the position of the selector valve 230 may be adjustable between the first open position and the second open position such that portions of the exhaust gas may flow to both the first exhaust gas path 235 and the second exhaust gas path 240. Therefore, the position of the selector valve 230 determines whether the exhaust gas is diverted to the first exhaust gas path 235, the second exhaust gas path 240, both the first and second exhaust gas paths, or neither.

The first exhaust gas path 235 may be configured for use during cold-start conditions when the temperature of the exhaust gas (e.g., as measured by the temperature sensor 215) is below a predetermined temperature threshold. For example, in some embodiments, if the temperature of the exhaust gas is between about 70° C.-180° C., the first exhaust gas path 235 may be used for treating the exhaust gas exiting the DPF 225. In some embodiments, the second exhaust gas path 240 may be used during normal conditions when the temperature of the exhaust gas is above 180° C. The temperature ranges for diverting the exhaust gas to either the first exhaust gas path 235 or the second exhaust gas path 240 may vary in other embodiments. Thus, the controller 275 may receive the temperature, as measured via the temperature sensor 215, of the exhaust gas flowing through the inlet conduit 210. Based on the temperature of the exhaust gas, the controller 275 may adjust the position of the selector valve 230 to divert all of the exhaust gas to either the first exhaust gas path 235 or the second exhaust gas path 240. For example, if the predetermined temperature threshold is 180° C., the controller 275 may instruct the selector valve 230 to move to the first open position to divert all of the exhaust gas to the first exhaust gas path 235 when the temperature of the exhaust gas is equal to or less than 180° C. Similarly, if the temperature of the exhaust gas is above 180° C., the controller 275 may instruct the selector valve 230 to move to the second open position to divert all of the exhaust gas to the second exhaust gas path 240.

Because the first exhaust gas path 235 is configured to be used during cold-start conditions, the first exhaust gas path 235 may be optimized for efficient operation during those cold-start conditions. For example, during cold-start conditions, the reductant that is injected into the first decomposition chamber 250A in liquid form may be more susceptible to depositing on the walls of the first decomposition chamber, and decreasing the operating efficiency of the first decomposition chamber. Thus, in some embodiments, the first injector 245A may be associated with a vaporizer to vaporize the reductant before injection. Injecting the reductant in vaporized form may reduce formation of reductant deposit on the walls of the first decomposition chamber 250A. Reducing the formation of reductant deposit may increase the operating efficiency of the first decomposition chamber 250A. In other embodiments, a commercial reductant delivery injection system or another mechanism that is configured to reduce reductant deposits in the first decomposition chamber 250A during cold-start conditions may be used.

In some embodiments, instead of or in addition to using a vaporizer, the heater 270 may be used to heat the exhaust gas that has been diverted to the first exhaust gas path 235 to increase the temperature of the exhaust gas, which in turn may increase the temperature in the internal cavity of the first decomposition chamber 250A. Providing sufficient heat to the first decomposition chamber 250A may further assist in reducing the formation of reductant deposits on the walls of the first decomposition chamber 250A. For example, in some embodiments, the heat from the heater 270 may reduce the droplet size of the reductant, whether in liquid or vaporized form, in the first decomposition chamber 250A, thereby reducing the formation of reductant deposits in the first decomposition chamber.

The heater 270 may be controlled by the controller 275. The controller 275 may activate the heater 270 based on the temperature of the exhaust gas that is diverted to the first exhaust gas path 235 and the target temperature that is desired in the first decomposition chamber 250A. The controller 275 may be configured to deactivate the heater 270 when the target temperature within the first decomposition chamber 250A is reached. A temperature sensor (not shown) may be positioned within the first decomposition chamber 250A to measure the temperature in the internal cavity of the first decomposition chamber. The amount of time for which the heater 270 is activated may be based on the capacity of the heater and the amount of heat that is needed to attain the desired temperature. For example, in some embodiments, the heater may be configured such that 1 kilowatt of power of the heater 270 increases exhaust gas temperature at a rate of about 5° C. per second. In other embodiments, the heater 270 may be configured to attain other heating rates. Thus, the first exhaust gas path 235, and particularly the first decomposition chamber 250A of the first exhaust gas path, may be optimized for reducing reductant deposits by using a vaporizer to vaporize the reductant before insertion and/or by using heat from the heater 270 to vaporize the reductant (or reduce the droplet size of the reductant) after insertion. Other or additional mechanisms that may be configured to reduce reductant deposit in the first decomposition chamber 250A may be used in other embodiments.

In some embodiments, the first SCR 255A may also be optimized for operating during the cold-start conditions. For example, in some embodiments, the type of SCR catalyst that is used in the first SCR 255A may be one that is more suitable for use during cold-start conditions. In some embodiments, the SCR catalyst in the first SCR 255A may be a copper based, vanadium based, iron based, or a combination thereof. Further, in some embodiments, the first SCR 255A may be configured to be filled with ammonia at all times. During normal operating conditions (e.g., when the temperature of the exhaust gas is above 180° C.), ammonia from an SCR catalyst may be desorbed and lost to the atmosphere. Thus, during normal operating conditions, continuous ammonia storage in the SCR catalyst is undesirable. However, during cold-start conditions, the ammonia that is adsorbed into the SCR catalyst is not readily desorbed.

Thus, in some embodiments, the SCR catalyst in the first SCR 255A may be filled with ammonia at all times, such that the first SCR 255A is able to reduce NOx from the exhaust gas as soon as the first SCR receives the mixture of gaseous ammonia and exhaust gas from the first decomposition chamber 250A without having to first wait for the gaseous ammonia to adsorb in the SCR catalyst of the first SCR 255A. In such embodiments in which the first SCR 255A is configured for high ammonia storage at all times, the amount of reductant that is injected into the first decomposition chamber 250A may be reduced to account for the ammonia storage in the first SCR. Thus, the SCR catalyst in the first SCR 255A may be selected for high NOx reduction during low temperatures (e.g., during cold-start conditions) and high ammonia storage.

Further, the first SCR 255A may be configured to start achieving a desired level of NOx reduction at a given temperature. The heater 270 may be used to heat the exhaust gas such that the first SCR 255A reaches that given temperature in an internal cavity thereof. For example, in some embodiments, if the given temperature at which the first SCR 255A starts achieving the desired level of NOx reduction is about 150° C., and the temperature of the exhaust gas entering the first exhaust gas path 235 (and/or at the inlet of the first SCR) is about 90° C., the controller 275 may activate the heater 270 until the temperature of the exhaust gas is at least 150° C. such that the heat from the exhaust gas heats the internal cavity of the first SCR 255A. In some embodiments, the SCR catalyst within the first SCR 255A may be a coupled reductant catalyst that may be configured to store the NOx species in the exhaust gas as ammonium nitrate below a certain temperature and release the NOx at a controlled rate when the first SCR heats up (e.g., using the heater 270) to a certain temperature, thereby achieving optimal NOx reduction efficiency and accelerating soot oxidation across various filters under cold-start conditions. Thus, the first exhaust gas path 235, and particularly the first SCR 255A of the first exhaust gas path, may be optimized for achieving a desired level of NOx reduction by using an SCR catalyst that is optimized for cold-start conditions and/or optimized for high ammonia storage, and/or by using heat from the heater 270 to increase the temperature within the first SCR. Thus, the first decomposition chamber 250A and/or the first SCR 255A may be configured for optimal operation during cold-start conditions.

Additionally, the controller 275 may be configured to dynamically control the insertion of reductant in the first decomposition chamber 250A based on one or more inputs. For example, in some embodiments, the controller 275 may be configured to control the amount of reductant that is inserted into the first decomposition chamber 250A based on the temperature of the exhaust gas entering the first exhaust gas path 235, the temperature within the cavity of the first SCR 255A, the total ammonia storage within the first SCR, ambient pressure, the desired NOx reduction efficiency, and/or the engine out NOx flux (e.g., amount of NOx in the exhaust gas exiting the outlet conduit 265). In other embodiments, the controller 275 may use other or additional inputs such as temperature of the exhaust gas in the outlet conduit 265, temperature of the exhaust gas at the inlet of the first SCR, amount of NOx at the inlet of the first SCR, etc., to dynamically vary the injection of reductant into the first decomposition chamber 250A. To dynamically vary the amount of reductant that is injected into the first decomposition chamber 250A, the controller may receive one or more of the above inputs and determine in real-time or substantial real-time the amount of reductant that needs to be inserted into the first decomposition chamber 250A. Upon determining the amount of reductant, the controller 275 may control the first injector 245A to insert the determined amount of the reductant. Although not shown, the first exhaust gas path 235 may include sensors installed at appropriate positions for providing data to the controller 275 based on which the controller may dynamically adjust the injection of the reductant in the first decomposition chamber 250A.

The controller 275 may also use data from one or more of such sensors to control the operation of the heater 270. For example, the controller 275 may determine the temperature within the internal cavity of the first decomposition chamber 250A and/or the first SCR 255A. The controller 275 may also know the target temperature at which the reductant deposits within the first decomposition chamber 250A are reduced. Thus, based on the temperature of the exhaust gas, the current temperature within the first decomposition chamber 250A, the target temperature within the first decomposition chamber, and the capacity (e.g., power) of the heater 270, the controller 275 may determine the temperature to which the exhaust gas needs to be heated and the amount of time for which the heater needs to be activated to achieve the target temperature within the first decomposition chamber. Similarly, based on the temperature of the exhaust gas, the temperature within the internal cavity of the first SCR 255A, the desired NOx reduction level, the temperature at which the desired NOx reduction level is achieved, and the capacity of the heater 270, the controller 275 may determine the temperature to which the exhaust gas needs to be heated and the time for which the heater needs to be activated for achieving the desired NOx reduction level.

Thus, by dynamically activating and deactivating the heater 270, and controlling the injection of reductant in the first decomposition chamber 250A in real-time (or substantially in real-time) based on feedback received during operation, the first exhaust gas path 235 provides a close-coupled system.

With respect to the second exhaust gas path 240, because the second exhaust gas path is configured for normal operation (e.g., when the temperature of the exhaust gas is above 180° C.), the second decomposition chamber 250B is not as susceptible to reductant deposits as the first decomposition chamber 250A. Thus, the reductant may continue to be injected in liquid form (e.g., using a wet or liquid doser) in the second decomposition chamber 250B, although if desired, a vaporizer may be associated with the second injector 245B to vaporize the reductant before injection into the second decomposition chamber. Similarly, a standard SCR may continue to be used for the second SCR 255B. A standard SCR may include an SCR catalyst that is not specifically designed for high ammonia storage and/or optimized for low temperatures.

Further, in some embodiments, the relative sizes of the first SCR 255A and the second SCR 255B may vary. For example, because the first SCR 255A is used for a shorter period of time (e.g., until the exhaust gas temperature becomes greater than 180° C.) compared to the second SCR 255B, the first SCR may be smaller in size than the second SCR. Similarly, in some embodiments, the first decomposition chamber 250A may be smaller in size than the second decomposition chamber 250B, and the amount of reductant that is injected into each of the first decomposition chamber and the second decomposition chamber may vary. In some embodiments, a fixed amount of reductant may be inserted into the second decomposition chamber 250B, while the controller 275 may dynamically adjust the amount of reductant that is inserted into the first decomposition chamber 250A. In other embodiments, the controller 275 may also dynamically adjust the amount of reductant that is inserted into the second decomposition chamber 250B.

Figure 3:
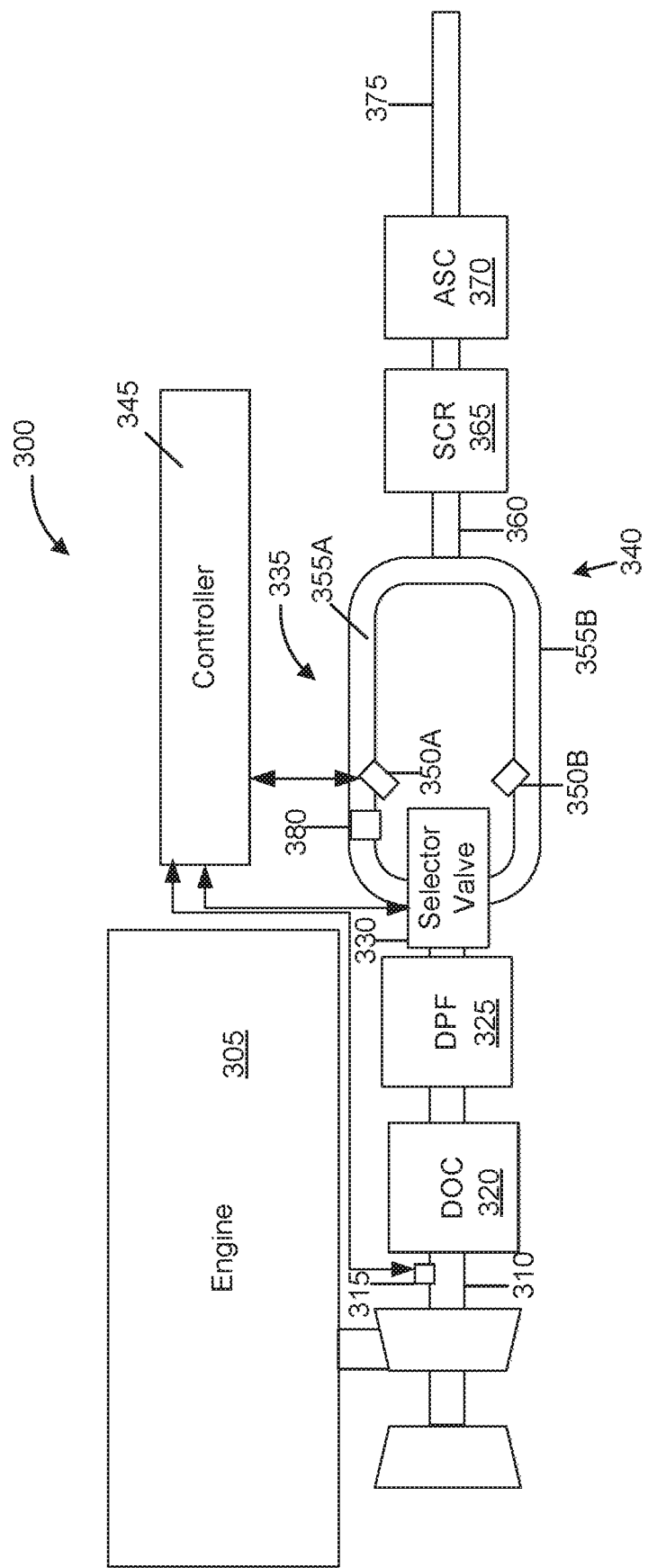
FIG. 3 is yet another example block diagram of the aftertreatment system showing another close coupled system in which the exhaust is diverted to either a first exhaust gas path or a second exhaust gas path, in accordance with some embodiments of the present disclosure.

Referring now to FIG. 3, an example block diagram of an aftertreatment system 300 is shown, in accordance with some embodiments of the present disclosure. The aftertreatment system 300 is similar to the aftertreatment system 100 in that the aftertreatment system 300 includes similar elements as the aftertreatment system 100, although only some of those elements are shown in FIG. 3. The aftertreatment system 300 includes an engine 305 from which exhaust gas enters into an inlet conduit 310. In the inlet conduit 310, the temperature of the exhaust gas is measured by a temperature sensor 315, which in some embodiments, may be a thermistor. From the inlet conduit 310, the exhaust gas passes into a DOC 320 and optionally through a DPF 325 positioned downstream of the DOC before being diverted by a selector valve 330 positioned downstream of the DPF. The DOC 320 is similar to the oxidation catalyst 120, the DPF 325 is similar to the particulate filter discussed above, and the selector valve 330 is similar to the selector valve 230. Thus, the selector valve 330 is a multi-position valve that diverts exhaust gas between a first exhaust gas path 335 and a second exhaust gas path 340 based on instructions received from a controller 345. The controller 345 is similar to the controller 165.

Similar to the first exhaust gas path 235, the first exhaust gas path 335 is configured for use during cold-start conditions (e.g., when the temperature of the exhaust gas is between about 70° C.-180° C.). The first exhaust gas path 335 includes a first injector 350A for injecting reductant into a first decomposition chamber 355A, while the second exhaust gas path 340 includes a second injector 350B to inject reductant into a second decomposition chamber 355B. The first exhaust gas path 335 and the second exhaust gas path 340 combine to form a combined exhaust gas path 360. The combined exhaust gas path 360 is downstream of the first decomposition chamber 355A and the second decomposition chamber 355B. The combined exhaust gas path 360 includes an SCR 365 and an ASC 370 downstream of the SCR. The exhaust gas from the ASC 370 is emitted into the atmosphere using an outlet conduit 375.

Thus, in contrast to the aftertreatment system 200 in which each of the first exhaust gas path 235 and the second exhaust gas path 240 has their respective SCR (e.g., the first SCR 255A, the second SCR 255B) and ASC (e.g., the first ASC 260A, the second ASC 260B), the first exhaust gas path 335 and the second exhaust gas path 340 do not include SCR and ASC. Rather, the mixture of the exhaust gas and the gaseous ammonia from each of the first exhaust gas path 335 and the second exhaust gas path 340 flows into the SCR 365 of the combined exhaust gas path 360. The SCR 365 oxidizes the ammonia in the presence of an SCR catalyst for reducing NOx in the exhaust gas and the ASC 370 decomposes any unreacted ammonia from the exhaust gas. In some embodiments, the SCR 365 may be a standard SCR.

Further, the selector valve 330 may be configured to divert at least a portion of the exhaust gas to the first exhaust gas path 335 when the temperature (e.g., as measured by the temperature sensor 315) of the exhaust gas is equal to or below a predetermined temperature threshold (e.g., 180° C.). Specifically, the controller 345 may determine the temperature of the exhaust gas flowing through the inlet conduit 310 and adjust the position of the selector valve 330 to a first open position or to a position between the first open position and the second open position to divert at least a portion the exhaust gas to the first exhaust gas path 335 if the temperature of the exhaust gas is less than or equal to the predetermined temperature threshold (e.g., 180° C.).

In some embodiments, the controller 345 may be configured to divert all of the exhaust gas to the first exhaust gas path 335 when the temperature of the exhaust gas is equal to or below predetermined temperature threshold (e.g., 180° C.). In such embodiments, the controller 345 may adjust the position of the selector valve 330 to the first open position. In other embodiments, the controller 345 may be configured to divert only a portion of the exhaust gas to the first exhaust gas path 335 when the temperature of the exhaust gas is equal to or below the predetermined temperature threshold (e.g., 180° C.). In such embodiments, the controller 345 may adjust the position of the selector valve 330 to be in between the first open position and the second open position based on the portion of the exhaust gas that is to be diverted to the first exhaust gas path 335. Further, any exhaust gas that is not diverted to the first exhaust gas path 335 is diverted to the second exhaust gas path 340.

The portion of the exhaust gas that is diverted to the first exhaust gas path 335 may be pre-determined. For example, in some embodiments, about 50% of the exhaust gas may be diverted to the first exhaust gas path 335 when the temperature of the exhaust gas is equal to or below the predetermined temperature threshold (e.g., 180° C.). The remaining about 50% of the exhaust gas may be diverted to the second exhaust gas path 340. To divert about 50% of the exhaust gas to the first exhaust gas path 335, the controller 345 may adjust the position of the selector valve 330 to be somewhat mid-way between the first open position and the second open position. In other embodiments, a different proportion of the exhaust gas may be diverted to the first exhaust gas path 335. Thus, by varying the position of the selector valve 330 between the first open position and the second open position, the controller 345 may divert a portion of the exhaust gas to the first exhaust gas path 335 and a portion of the exhaust gas to the second exhaust gas path 340 when the temperature of the exhaust gas is less than or equal to the predetermined temperature threshold (e.g., 180° C.). When the temperature of the exhaust gas is above the predetermined temperature threshold (e.g., 180° C.), the controller 345 may divert all of the exhaust gas to the second exhaust gas path 340.

Further, although the temperature of the exhaust gas based on which the controller 345 controls the selector valve 330 is measured in the inlet conduit 310, in some embodiments, the temperature of the exhaust gas may be measured at the outlet of the DOC 320 and/or the outlet of the DPF 325.

Additionally, the exhaust gas that is diverted to the first exhaust gas path 335 may be heated by a heater 380. The heater 380 may be controlled by the controller 345 to reduce reductant deposits in the first decomposition chamber 355A. Thus, based on the temperature of the exhaust gas entering the first exhaust gas path 335, the temperature of the exhaust gas in the first decomposition chamber 355A, the desired temperature within the first decomposition chamber, the capacity of the heater 380, and any other inputs that may be useful in increasing the efficiency of the first decomposition chamber, the controller may activate the heater for a period of time to heat the internal cavity of the first decomposition chamber. In some embodiments, the first decomposition chamber 355A may also be configured to receive the reductant in vaporized form using a vaporizer coupled with the first injector 350A to reduce reductant deposits on the walls of the first decomposition chamber. Similarly, in some embodiments, the reductant may be injected in the second decomposition chamber 355B in liquid form using a wet or liquid doser. In some embodiments, the second injector 350B may be coupled to a vaporizer to vaporize the reductant before insertion into the second decomposition chamber 355B.

Additionally, in some embodiments and as discussed above, the controller 345 may be configured to dynamically adjust the amount of reductant that is inserted into the first decomposition chamber 355A and/or the second decomposition chamber 355B. For example, the controller 345 may receive data in real-time or substantial real-time from one or more components of the first exhaust gas path 335 and the combined exhaust gas path 360 to dynamically vary the amount of reductant being inserted into the first decomposition chamber 355A. Similarly, the controller 345 may receive data from one or more components of the second exhaust gas path 340 and the combined exhaust gas path 360 to dynamically vary the amount of reductant being inserted into the second decomposition chamber 355B. Thus, the first exhaust gas path 335 along with the combined exhaust gas path 360 forms a first parallel close-coupled system, while the second exhaust gas path 340 along with the combined exhaust gas path forms another parallel close-coupled system.

Figure 4A:
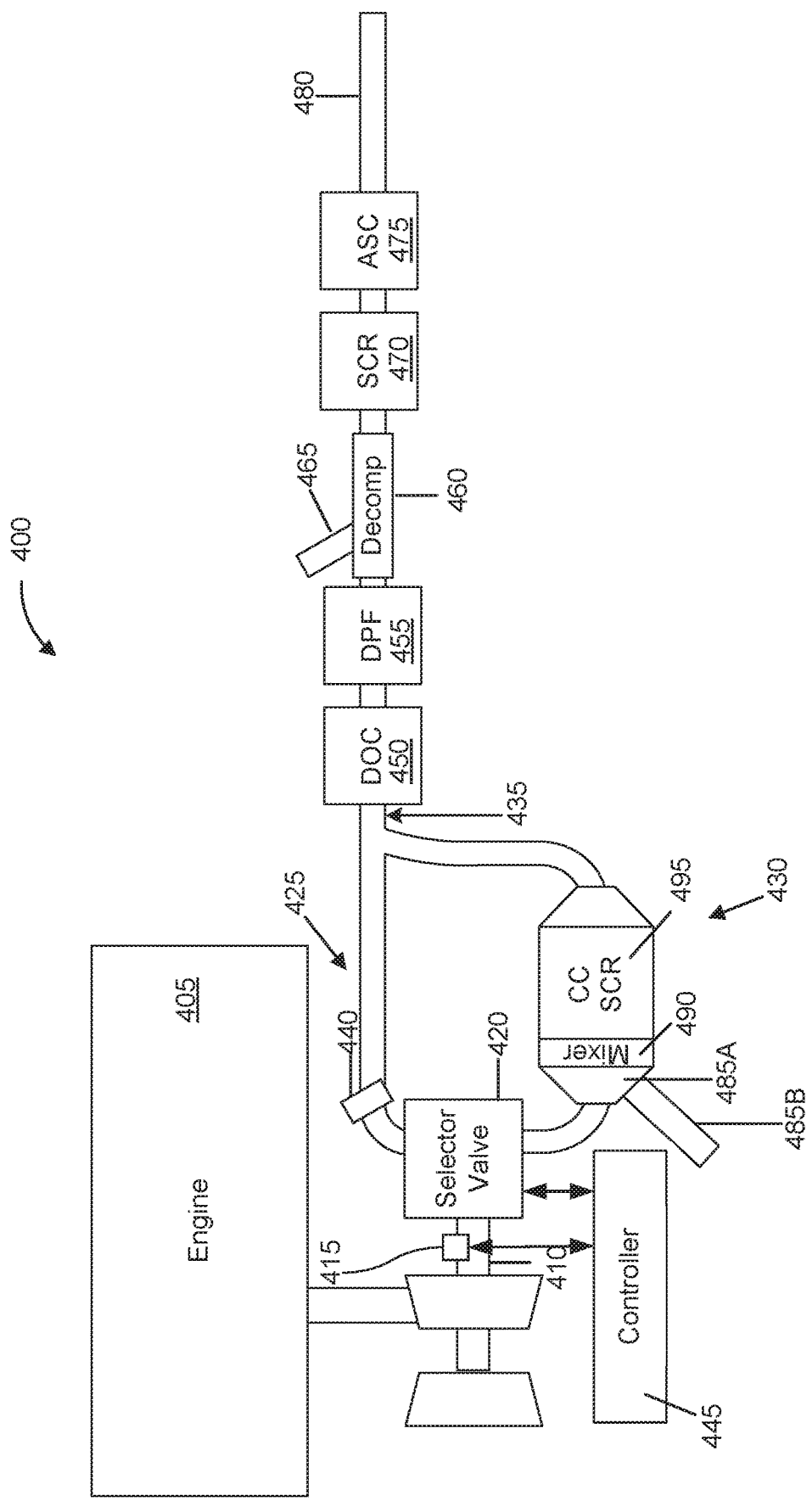
FIGS. 4A and 4B are an example block diagram of the aftertreatment system showing close coupled systems in which the exhaust gas enters a combined exhaust gas path from either a first exhaust gas path or a second exhaust gas path, in accordance with some embodiments of the present disclosure.
Figure 4B:
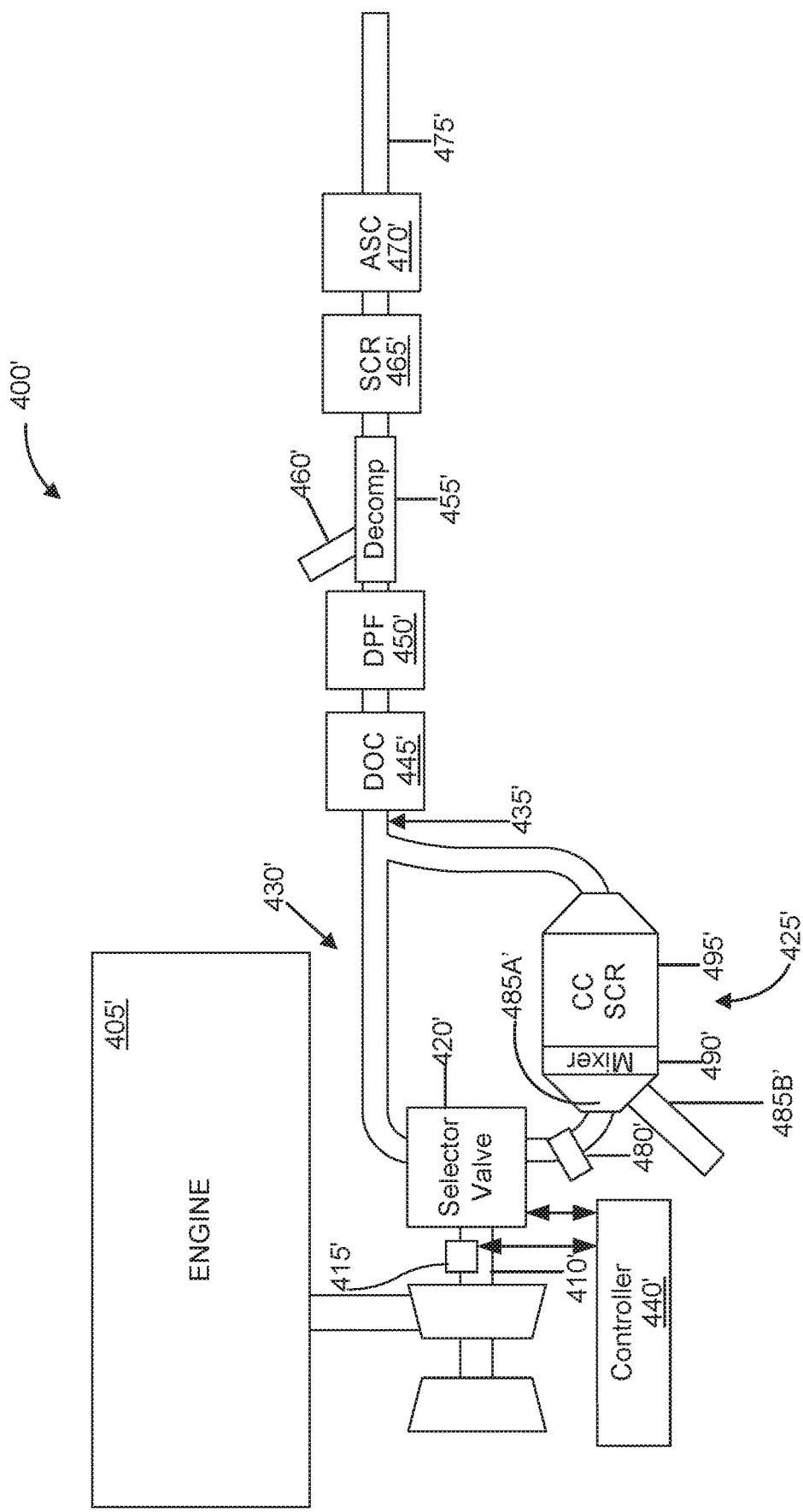

Referring to FIGS. 4A and 4B, example block diagrams of aftertreatment systems 400 and 400', respectively, are shown, in accordance with some embodiments of the present disclosure. The aftertreatment systems 400 and 400' are similar to the aftertreatment system 100 in that the aftertreatment systems 400 and 400' include similar elements as the aftertreatment system 100, although only some of those elements are shown in FIGS. 4A and 4B. The aftertreatment system 400 shows a first serial implementation, while the aftertreatment system 400' shows a second serial implementation.

Referring specifically to FIG. 4A, the aftertreatment system 400 includes an engine 405 from which exhaust gas enters into an inlet conduit 410. In the inlet conduit 410, the temperature of the exhaust gas is measured by a temperature sensor 415, which in some embodiments, may be a thermistor. From the inlet conduit 410, the exhaust gas is diverted by a selector valve 420. The selector valve 420 is similar to the selector valve 230. The selector valve 420 diverts the exhaust gas from the inlet conduit 410 to either a first exhaust gas path 425 or a second exhaust gas path 430. The first exhaust gas path 425 and the second exhaust gas path 430 combine together to form a combined exhaust gas path 435 downstream of the first exhaust gas path and the second exhaust gas path.

The first exhaust gas path 425 may be used during cold-start conditions to heat the exhaust gas to a desired temperature by a heater 440 before entering the combined exhaust gas path 435. Thus, when the temperature of the exhaust gas is at or below a predetermined temperature threshold (e.g., 180° C.), a controller 445 may adjust the position of the selector valve 420 to the first open position to divert all of the exhaust gas into the first exhaust gas path 425. When the temperature of the exhaust gas is above the predetermined temperature threshold (e.g., 180° C.), the controller 445 may adjust the position of the selector valve 420 to the second open position to divert all of the exhaust gas to the second exhaust gas path 430. In the first exhaust gas path 425, the exhaust gas is heated by the heater 440 to a desired temperature. The temperature to which the exhaust gas is heated may be dependent upon the target temperature that is desired in one or more elements of the combined exhaust gas path 435. In some embodiments, a heater may also be provided in the second exhaust gas path 430 and/or in the combined exhaust gas path 435.

The heated exhaust gas from the first exhaust gas path 425 enters the combined exhaust gas path 435, particularly, a DOC 450 of the combined exhaust gas path. The exhaust gas may optionally pass from the DOC 450 to a DPF 455 positioned downstream of the DOC. The DOC 450 is similar to the oxidation catalyst 120 and the DPF 455 is similar to the particulate filter discussed above with respect to FIG. 1. From the DPF 455, the heated exhaust gas is mixed with reductant in a first decomposition chamber 460. The reductant is inserted into the first decomposition chamber 460 by a first injector 465. The reductant may be inserted in liquid form (e.g., using a wet or liquid doser) or in vaporized form (e.g., using a vaporizer). The mixture of the exhaust gas and the reductant is diverted through a first SCR 470 and an ASC 475 of the combined exhaust gas path 435 before being released into the atmosphere via an outlet conduit 480. The first SCR 470 may be a standard SCR.

The controller 445 may be configured to heat the exhaust gas in the first exhaust gas path 425 to achieve a target temperature within the first decomposition chamber 460 and/or the first SCR 470. By positioning the first decomposition chamber 460 and the first SCR 470 in the combined exhaust gas path 435, the same decomposition chamber and SCR may be used for both the first exhaust gas path 425 and the second exhaust gas path 430. Further, by using the heater 440 to heat the exhaust gas diverted to the first exhaust gas path 425 to achieve a target temperature within the first decomposition chamber 460 and/or the first SCR 470, the operating efficiency of the first decomposition chamber and/or the first SCR may be increased during cold-start conditions.

When the controller 445 diverts the exhaust gas to the second exhaust gas path 430, the exhaust gas enters a second decomposition chamber 485A that receives reductant via a second injector 485B. The second decomposition chamber 485A may be configured to receive the reductant in either liquid form or vaporized form. In some embodiments, the mixing of the exhaust gas and the gaseous ammonia from the reductant may be facilitated by using a mixer 490 positioned downstream of the second decomposition chamber 485A. Although not shown, a mixer may be used in conjunction with the first and second decomposition chambers in the embodiments of FIGS. 2 and 3 as well. The mixture of the exhaust gas and the reductant from the mixer 490 is diverted to a second SCR 495 before passing the exhaust gas to the combined exhaust gas path 435. In the combined exhaust gas path 435, the exhaust gas passes through the first decomposition chamber 460, the first SCR 470, and the ASC 475 before being emitted via the outlet conduit 480.

Thus, the exhaust gas from the inlet conduit 410 passes through either the first exhaust gas path 425 or the second exhaust gas path 430 before passing through the combined exhaust gas path 435. Further, in some embodiments, the controller 445 may be configured to dynamically adjust the amount of reductant being inserted into the first decomposition chamber 460 and/or the second decomposition chamber 485A based on feedback received from one or more components of the aftertreatment system 400. For example, when the exhaust gas is being diverted through the first exhaust gas path 425, the controller 445 may dynamically adjust the amount of reductant being inserted into the first decomposition chamber 460 based on feedback from one or more components of the first exhaust gas path 425 and the combined exhaust gas path 435. When the exhaust gas is being diverted through the second exhaust gas path 430, the controller 445 may dynamically adjust the amount of reductant being inserted into the first decomposition chamber 460 and/or the second decomposition chamber 485A based on feedback from one or more components of the second exhaust gas path and the combined exhaust gas path 435.

The embodiment of FIG. 4B is largely similar to the embodiment of FIG. 4A except that the first exhaust gas path and the second exhaust gas path are reversed in FIG. 4B. Thus, the aftertreatment system 400' includes an engine 405' from which exhaust gas enters an inlet conduit 410'. The temperature of the exhaust gas may be measured in the inlet conduit 410' by a temperature sensor 415', which in some embodiments may be a thermistor. A selector valve 420' may divert the exhaust gas to either a first exhaust gas path 425' or a second exhaust gas path 430'. The first exhaust gas path 425' and the second exhaust gas path 430' may combine together to form a combined exhaust gas path 435' downstream of the first exhaust gas path and the second exhaust gas path. When a controller 440' determines that the temperature of the exhaust gas as measured by the temperature sensor 415' is equal to or less than a predetermined temperature threshold (e.g., 180° C.), the controller may adjust a position of the selector valve 420 to the first open position to divert all of the exhaust gas to the first exhaust gas path 425'. When the controller 440' determines that the temperature of the exhaust gas is greater than the predetermined temperature threshold (e.g., 180° C.), the controller may adjust the position of the selector valve 420' to the second open position to divert all of the exhaust gas to the second exhaust gas path 430'. From the first exhaust gas path 425' or the second exhaust gas path 430', the exhaust gas enters the combined exhaust gas path 435'.

The combined exhaust gas path 435' may include a DOC 445', a DPF 450' downstream of the DOC, a first decomposition chamber 455' downstream of the DPF, an injector 460' for injecting reductant into the first decomposition chamber, a first SCR 465' downstream of the first decomposition chamber, and an ASC 470' downstream of the first SCR. The exhaust gas is emitted into the atmosphere via an outlet conduit 475' downstream of the ASC 470'.

The first exhaust gas path 425' includes a heater 480' configured to heat the exhaust gas diverted to the first exhaust gas path by the selector valve 420'. The heated exhaust gas is mixed with gaseous ammonia within a second decomposition chamber 485A' that receives reductant via a second injector 485B'. A mixer 490' may facilitate the mixing of the exhaust gas with the gaseous ammonia. A second SCR 495' then oxidizes at least a portion of the gaseous ammonia to reduce NOx in the exhaust gas before flowing into the combined exhaust gas path 435' to be further treated. The controller 440' may heat the exhaust gas to a temperature that is desired in the second decomposition chamber 485A', the second SCR 495', the first decomposition chamber 455', and/or the first SCR 465'. Further, as discussed above, the controller 440' may dynamically adjust the amount of reductant that is inserted into the first decomposition chamber 455' and/or the second decomposition chamber 485A' based on feedback from one or more inputs. In some embodiments, a heater may also be provided in the second exhaust gas path 430' and/or the combined exhaust gas path 435'.

Figure 5:
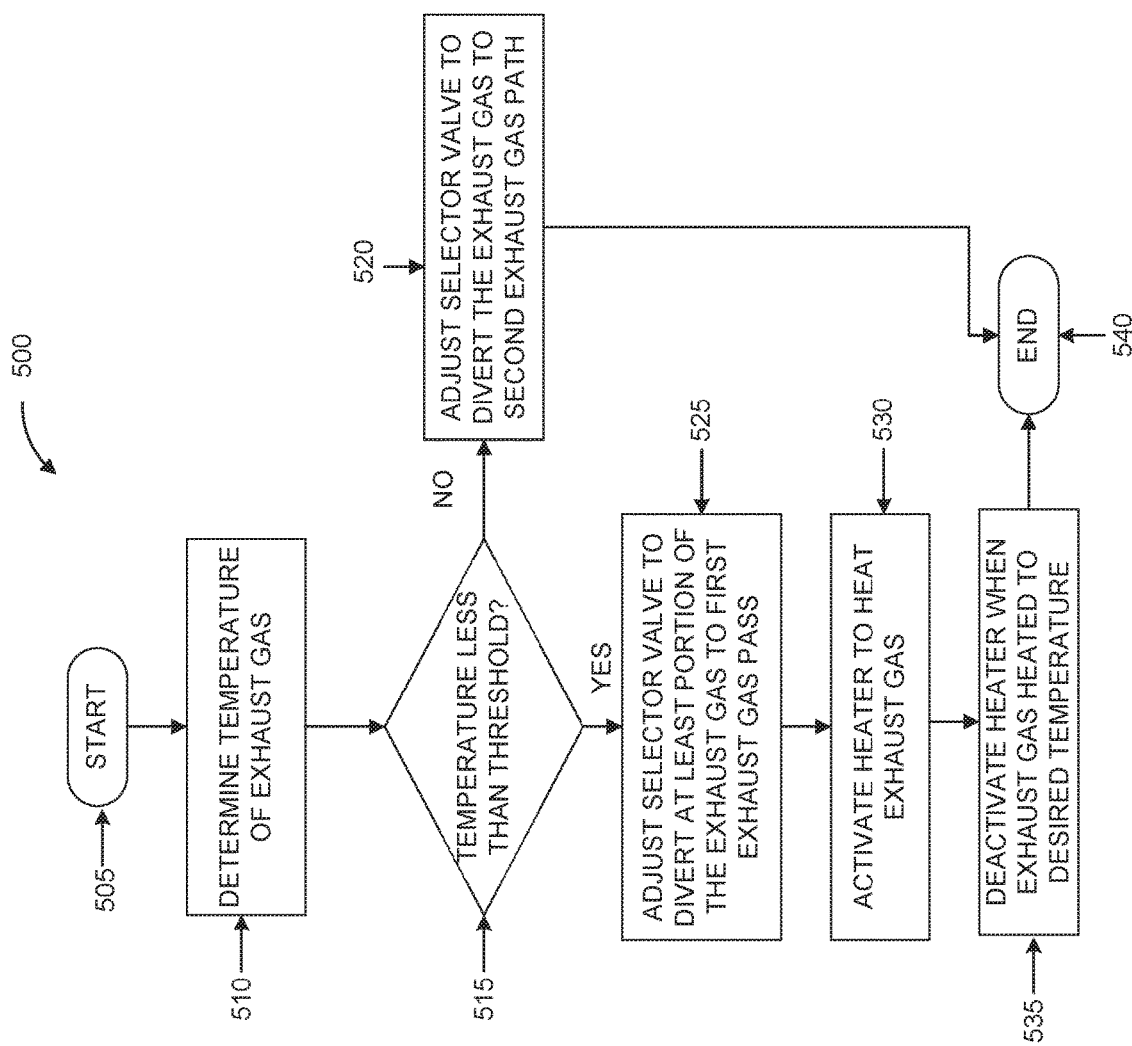
FIG. 5 is an example flow diagram outlining operations for operating the aftertreatment systems of FIGS. 2-4B, in accordance with some embodiments of the present disclosure.

Turning to FIG. 5, an example flow chart outlining a process 500 for treating exhaust gas using an aftertreatment system is shown, in accordance with some embodiments of the present disclosure. The process 500 may be implemented using the aftertreatment systems 200, 300, 400, 400' above, and particularly, by the controllers (e.g., the controller 275, the controller 345, the controller 445, the controller 440') of those aftertreatment systems. The process starts at operation 505 with the engine (e.g., the engine 205, the engine 305, the engine 405, the engine 405') emitting the exhaust gas into the inlet conduit (e.g., the inlet conduit 210, the inlet conduit 310, the inlet conduit 410, the inlet conduit 410'). At operation 510, the controller receives the temperature of the exhaust gas in the inlet conduit. For example, the controller 275 may receive the temperature of the exhaust gas in the inlet conduit 210 as measured by the temperature sensor 215. Similarly, the controller 345 may receive the temperature of the exhaust gas as measured by the temperature sensor 315 in the inlet conduit 310, while the controller 445 may receive the temperature of the exhaust gas as measured by the temperature sensor 415 in the inlet conduit 410, and the controller 440' may receive the temperature of the exhaust gas as measured via the temperature sensor 415' in the inlet conduit 410'.

In other embodiments, the controller 275 may additionally or alternatively determine the temperature of the exhaust gas at other locations such as the outlet of the DPF 225 and/or the outlet of the DOC 220. Similarly, in some embodiments, the controller 345 may additionally or alternatively determine the temperature of the exhaust gas at the outlet of the DOC 320 and/or the outlet of the DPF 325. When the controller determines the temperature of the exhaust gas at multiple locations, the controller may apply a mathematical function (e.g., average) to the various determined exhaust gas temperatures and adjust the selector valve (e.g., the selector valve 230, the selector valve 330, the selector valve 420, the selector valve 420') based on the computed average temperature.

At operation 515, the controller determines whether the temperature of the exhaust gas as determined at the operation 510 is less than a predetermined temperature threshold (e.g., 180° C.). If the controller determines that the temperature of the exhaust gas is greater than the predetermined threshold, the controller adjusts the position of the selector valve at operation 520 to the second open position to divert all of the exhaust gas to the second exhaust gas path (e.g., the second exhaust gas path 240, the second exhaust gas path 340, the second exhaust gas path 430, the second exhaust gas path 430'). Alternatively, if at the operation 515, the controller determines that the temperature of the exhaust gas is equal to or less than the predetermined temperature threshold, the controller adjusts the position of the selector valve at operation 525 to the first open position or a position between the first open position and the second open position to divert at least a portion of the exhaust gas to the first exhaust gas path (e.g., the first exhaust gas path 235, the first exhaust gas path 335, the first exhaust gas path 425, the first exhaust gas path 425'), as discussed above.

For example, in the aftertreatment systems 200, 400, 400', upon determining that the temperature of the exhaust gas is equal to or below the predetermined temperature threshold, the controller 275, the controller 445, and the controller 440' respectively, divert all of the exhaust gas to the respective first exhaust gas path 235, the first exhaust gas path 425, and the first exhaust gas path 425'. In contrast, in the aftertreatment system 300, upon determining that the temperature of the exhaust gas the controller is equal to or below the predetermined temperature threshold, the controller 345 diverts only a predetermined portion of the exhaust gas to the first exhaust gas path 335. The controller 345 diverts the remaining portion of the exhaust gas to the second exhaust gas path 340.

In some embodiments, the controller may rely upon inputs in addition to the temperature of the exhaust gas in controlling the selector valve. For example, in some embodiments, the controller may receive inputs from an NOx sensor positioned at the inlet and/or outlet of the DOC (e.g., the DOC 220, the DOC 320, the DOC 450, the DOC 445'), inlet and/or outlet of the DPF (e.g., the DPF 225, the DPF 325, the DPF 450', the DPF 455), and/or at the outlet conduit (e.g., the outlet conduit 265, the outlet conduit 375, the outlet conduit 475', the outlet conduit 480) to determine an ammonia to NOx ratio (ANR) of the exhaust gas. In other embodiments, the controller may receive inputs from NOx sensors positioned at other or additional locations to determine the ANR. Based upon the ANR and the temperature of the exhaust gas, the controller may control the selector valve to divert the exhaust gas between the first exhaust gas path and/or the second exhaust gas path to achieve a desired NOx reduction efficiency. In some embodiments, the controller may rely only on ANR to control the selector valve. In other embodiments, the controller may use other or additional inputs to control the selector valve.

Further, at operation 530, when the exhaust gas is diverted to the first exhaust gas path, the controller activates a heater (e.g., the heater 270, the heater 380, the heater 440, or the heater 480') to heat the exhaust gas diverted to the first exhaust gas path. As discussed above, the controller may activate the heater to heat the exhaust gas until the temperature of the exhaust gas attains a desired temperature. The desired temperature may be based on a temperature in the decomposition chamber and/or the SCR that is desired in which the exhaust gas is to flow. The controller may receive feedback data on the current operating conditions in the decomposition chamber, the SCR system, and/or other components to determine the desired temperature. Upon determining that the desired temperature has been attained, the controller deactivates the heater at operation 535. The process 500 ends at operation 540.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As used herein, the term "about" generally mean plus or minus 10% of the stated value. For example, about 0.5 would include 0.45 and 0.55, about 10 would include 9 to 11, about 1000 would include 900 to 1100.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system comprising:
a first exhaust gas path comprising a first decomposition chamber configured to receive reductant and a first selective catalytic reduction catalyst downstream of the first decomposition chamber;
a second exhaust gas path comprising a second decomposition chamber configured to receive the reductant and a second selective catalytic reduction catalyst downstream of the second decomposition chamber;
a selector valve configured to divert exhaust gas between the first exhaust gas path and the second exhaust gas path based on a temperature of the exhaust gas; and
a controller programmed to control the selector valve such that:
the selector valve diverts at least a portion of the exhaust gas to the first exhaust gas path when the temperature of the exhaust gas is equal to or less than a predetermined temperature threshold; and
the selector valve diverts the exhaust gas to the second exhaust gas path when the temperature of the exhaust gas is greater than the predetermined temperature threshold,
wherein the first exhaust gas path comprises a heater configured to heat the exhaust gas received in the first exhaust gas path;
wherein the first decomposition chamber is configured to receive the exhaust gas that has been diverted to the first exhaust gas path by the selector valve and heated by the heater;
wherein the first selective catalytic reduction catalyst is configured to receive the reductant and the heated exhaust gas from the first decomposition chamber;
wherein the second decomposition chamber is configured to receive the exhaust gas that has been diverted to the second exhaust gas path by the selector valve; and
wherein the second selective catalytic reduction catalyst is configured to receive the reductant and the exhaust gas from the second decomposition chamber.

2. The aftertreatment system of claim 1, further comprising a reductant vaporizer configured to inject vaporized reductant into the first decomposition chamber.

3. The aftertreatment system of claim 1, wherein the first selective catalytic reduction catalyst comprises a copper based catalyst, an iron based catalyst, or a vanadium based catalyst.

4. The aftertreatment system of claim 1, wherein the first exhaust gas path further comprises an ammonia slip catalyst downstream of the first selective catalytic reduction catalyst.

5. The aftertreatment system of claim 1, wherein the second exhaust gas path further comprises an ammonia slip catalyst downstream of the second selective catalytic reduction catalyst.

6. The aftertreatment system of claim 1, further comprising a liquid reductant doser configured to inject liquid reductant into the second decomposition chamber.

7. The aftertreatment system of claim 1, wherein:
the first exhaust gas path comprises a first ammonia slip catalyst downstream of the first selective catalytic reduction catalyst, and
the second exhaust gas path comprises a second ammonia slip catalyst downstream of the second selective catalytic reduction catalyst.

8. The aftertreatment system of claim 1, wherein a size of the first selective catalytic reduction catalyst of the first exhaust gas path is smaller than a size of the second selective catalytic reduction catalyst of the second exhaust gas path.

9. The aftertreatment system of claim 1, wherein at least one of the first selective catalytic reduction catalyst or the second selective catalytic reduction catalyst is a selective catalytic reduction filter.

10. The aftertreatment system of claim 1, further comprising:
a reductant vaporizer configured to inject vaporized reductant into the first decomposition chamber; and
a liquid reductant doser configured to inject liquid reductant into the second decomposition chamber.

11. The aftertreatment system of claim 1, further comprising:
a combined exhaust gas path downstream of the first selective catalytic reduction catalyst and the second selective catalytic reduction catalyst,
wherein the combined exhaust path is configured to receive the exhaust gas from the first selective catalytic reduction catalyst and the second selective catalytic reduction catalyst.

12. The aftertreatment system of claim 1, further comprising an oxidation catalyst upstream of the selector valve.

13. The aftertreatment system of claim 12, further comprising a particulate filter downstream of the oxidation catalyst and upstream of the selector valve.

14. The aftertreatment system of claim 1, wherein the predetermined temperature threshold is in a range of 70° C. to 180° C.

15. The aftertreatment system of claim 1, wherein the controller is programmed to control the selector valve such that the selector valve diverts all of the exhaust gas to the first exhaust gas path when the temperature of the exhaust gas is equal to or less than the predetermined temperature threshold.

16. The aftertreatment system of claim 1, wherein the controller is further configured to control the selector valve based upon an ammonia to NOx ratio of the exhaust gas.

17. A method comprising:
   determining, by a controller associated with an aftertreatment system, a temperature of exhaust gas;
   comparing, by the controller, the temperature of the exhaust gas with a predetermined temperature threshold;
   when the temperature of the exhaust gas is equal to or less than the predetermined temperature threshold, adjusting a selector valve to a first position so as to divert at least a portion of the exhaust gas to a first exhaust gas path, and heating the exhaust gas in the first exhaust gas path, wherein a first decomposition chamber of the first exhaust gas path is configured to receive the exhaust gas that has been diverted to the first exhaust gas path by the selector valve and heated by the heater, and wherein a first selective catalytic reduction catalyst of the first exhaust gas path is configured to receive the reductant and the heated exhaust gas from the first decomposition chamber; and
   when the temperature of the exhaust gas is greater than the predetermined temperature threshold, adjusting the selector valve to a second position so as to divert at least a portion of the exhaust gas to a second exhaust gas path, wherein a second decomposition chamber of the second exhaust gas path is configured to receive the exhaust gas that has been diverted to the second exhaust gas path by the selector valve, and wherein a second selective catalytic reduction catalyst of the second exhaust gas path is configured to receive the reductant and the exhaust gas from the second decomposition chamber.

* * * * *